United States Patent
Bonn et al.

(10) Patent No.: US 6,490,242 B1
(45) Date of Patent: Dec. 3, 2002

(54) DISK CARTRIDGE WITH DUAL HOUSING STRUCTURE

(76) Inventors: Brian T. Bonn, 789 Sugar Pine Rd., Scotts Valley, CA (US) 95066; Warren L. Dalziel, 15801 Viewfield Rd., Monte Sereno, CA (US) 95030; Michael A. Maiers, 4862 Morden Dr., San Jose, CA (US) 95130-2131; Scot C. Fairchild, 66-A Monroe St., Santa Clara, CA (US) 95050; Douglas R. Plourde, Box 566 Highway 35-64, Somerset, WI (US) 54025; Wayne M. Hector, 250 Bridge St., Shoreview, MN (US) 55126; Jerrie R. Powers, 619 Lurel Ave., Hudson, WI (US) 54016-1902; Leo W. Spychalla, 7900 Scott Blvd., Cottage Grove, MN (US) 55016; Thiruppathy Srinivasan, 1753 W. 4650 South, Apt. #U, Roy, UT (US) 84067-3638

( * ) Notice: Subject to any disclaimer, the term of this patent is extended or adjusted under 35 U.S.C. 154(b) by 0 days.

(21) Appl. No.: 09/067,604

(22) Filed: Apr. 28, 1998

Related U.S. Application Data

(63) Continuation-in-part of application No. 08/846,916, filed on Apr. 29, 1997, now Pat. No. 6,243,350.

(51) Int. Cl.⁷ .............................................. G11B 23/03
(52) U.S. Cl. ...................................... 369/291; 360/133
(58) Field of Search .......................... 206/308.1, 308.3; 369/291; 360/133

(56) References Cited

U.S. PATENT DOCUMENTS

| | | | |
|---|---|---|---|
| 1,455,504 A | 5/1923 | Odom | |
| 3,609,721 A | 9/1971 | Meneley | 340/174.1 E |
| 3,897,069 A | 7/1975 | Lee | 274/47 |
| 4,089,414 A | * 5/1978 | Sandor et al. | 206/308.3 |

(List continued on next page.)

FOREIGN PATENT DOCUMENTS

| | | |
|---|---|---|
| EP | 0 721 187 A2 | 7/1996 |
| GB | 2 228 818 A | 9/1990 |
| JP | 60061949 | 4/1985 |

(List continued on next page.)

OTHER PUBLICATIONS

Hayashi, S. et al., "Solid Immersion Lens for Optical Storage," Stanford University, G.L. Report No. 5258, Feb. 1995 (9 page document).

(List continued on next page.)

Primary Examiner—William Klimowicz
(74) Attorney, Agent, or Firm—Shumaker & Sieffert, PA

(57) ABSTRACT

A data storage disk cartridge having a dual housing structure includes an inner housing that contains a disk, and an outer housing that contains the inner housing. The inner housing is at least partially removable from the outer housing for insertion into a disk drive. The outer housing remains external to the disk drive, however, except for a portion that is inserted into the drive to provide a docking channel for retraction of the inner housing. A shutter on the inner housing covers a portion of the disk, but is manipulable by the disk drive to uncover the disk and allow drive access. The dual housing structure of the cartridge is capable of significantly improving disk and drive reliability, particularly for recording applications that require higher areal recording densities, such as near field optical recording. In particular, the disk cartridge reduces the accumulation of debris on the disk and drive components. The dual-housing disk cartridge provides a system of partially redundant barriers that significantly reduce the possibility of debris accumulation. The barriers form a hierarchy of cleanliness that stands between the outside environment and the disk and drive components. Consequently, in a preferred mode, the disk is never exposed to the outside environment. The reduced amounts of debris contribute to more consistent optical and mechanical performance of the disk and drive, and thereby enhance data storage reliability.

43 Claims, 18 Drawing Sheets

U.S. PATENT DOCUMENTS

| | | | | |
|---|---|---|---|---|
| 4,101,948 A | | 7/1978 | Tadokoro et al. | 360/137 |
| 4,109,919 A | * | 8/1978 | Elliott et al. | 369/77.2 |
| 4,138,703 A | * | 2/1979 | Stave et al. | 360/133 |
| 4,239,108 A | * | 12/1980 | Coleman et al. | 206/312 |
| 4,239,238 A | * | 12/1980 | Coleman | 369/77.2 |
| 4,443,874 A | | 4/1984 | Steenberg | 369/291 |
| 4,463,849 A | * | 8/1984 | Prusak et al. | |
| 4,467,465 A | * | 8/1984 | Saito et al. | 369/77.2 |
| 4,471,397 A | | 9/1984 | Cloutier | 360/133 |
| 4,479,209 A | * | 10/1984 | Fukumitsu | 369/77.2 |
| 4,503,475 A | | 3/1985 | Hall | 360/137 |
| 4,504,879 A | | 3/1985 | Toldi et al. | 360/105 |
| 4,509,158 A | * | 4/1985 | Kang | 369/77.2 |
| 4,519,059 A | | 5/1985 | Denis | 369/74 |
| 4,622,618 A | | 11/1986 | Oishi et al. | 360/133 |
| 4,633,450 A | | 12/1986 | Gueugnon | 369/13 |
| 4,652,961 A | | 3/1987 | Dieffenbach | 360/133 |
| 4,660,117 A | * | 4/1987 | Carey et al. | 360/133 |
| 4,661,874 A | | 4/1987 | Buehl et al. | 360/128 |
| 4,683,506 A | | 7/1987 | Toldi et al. | 360/105 |
| 4,717,981 A | | 1/1988 | Nigam et al. | 360/133 |
| 4,722,012 A | | 1/1988 | Toldi et al. | 360/97 |
| 4,753,521 A | | 6/1988 | Deserno | 350/465 |
| 4,780,784 A | * | 10/1988 | Covington et al. | 360/133 |
| 4,789,916 A | | 12/1988 | Oishi | 360/133 |
| 4,791,516 A | | 12/1988 | Seto | 360/133 |
| 4,794,586 A | | 12/1988 | Korth | 369/215 |
| RE32,876 E | | 2/1989 | Wakabayashi et al. | 360/133 |
| 4,817,079 A | * | 3/1989 | Covington | 369/291 |
| 4,819,114 A | * | 4/1989 | Bernitt et al. | 360/133 |
| 4,864,437 A | | 9/1989 | Couse et al. | 360/75 |
| 4,864,452 A | | 9/1989 | Thompson et al. | 360/133 |
| 4,870,518 A | | 9/1989 | Thompson et al. | 360/97.01 |
| 4,885,652 A | * | 12/1989 | Leonard et al. | 360/133 |
| 4,965,780 A | | 10/1990 | Lee et al. | 369/13 |
| 4,969,061 A | * | 11/1990 | Patterson et al. | 360/133 |
| 4,977,475 A | | 12/1990 | Shiba et al. | 360/133 |
| 4,987,292 A | | 1/1991 | Howard | 250/201.5 |
| 5,020,040 A | | 5/1991 | Lee | 369/13 |
| 5,105,408 A | | 4/1992 | Lee et al. | 369/44.15 |
| 5,112,662 A | | 5/1992 | Ng | 428/64 |
| 5,115,363 A | | 5/1992 | Khan et al. | 360/104 |
| 5,120,603 A | | 6/1992 | Schmidt | 428/336 |
| 5,121,256 A | | 6/1992 | Corle et al. | 359/664 |
| 5,125,750 A | | 6/1992 | Corle et al. | 359/819 |
| 5,128,216 A | | 7/1992 | Ng | 428/695 |
| 5,136,448 A | | 8/1992 | Kiriyama et al. | 360/128 |
| 5,153,870 A | | 10/1992 | Lee et al. | 369/111 |
| 5,161,134 A | | 11/1992 | Lee | 369/13 |
| 5,182,444 A | | 1/1993 | Howard | 250/201.5 |
| 5,191,563 A | | 3/1993 | Lee et al. | 369/13 |
| 5,197,050 A | | 3/1993 | Murakami et al. | 369/13 |
| 5,202,880 A | | 4/1993 | Lee et al. | 369/275.4 |
| 5,212,683 A | * | 5/1993 | Heusden et al. | 369/291 |
| 5,223,710 A | | 6/1993 | Pavlak | 250/230 |
| 5,228,022 A | | 7/1993 | Compton et al. | 369/72 |
| 5,232,570 A | | 8/1993 | Haines et al. | 204/192.16 |
| 5,243,241 A | | 9/1993 | Wang | 310/36 |
| 5,247,510 A | | 9/1993 | Lee et al. | 369/118 |
| 5,255,260 A | | 10/1993 | Yamada et al. | 369/199 |
| 5,260,928 A | | 11/1993 | Lee et al. | 369/112 |
| 5,278,717 A | | 1/1994 | Sasaki et al. | 360/133 |
| 5,288,997 A | | 2/1994 | Betzig et al. | 250/227.26 |
| 5,295,122 A | | 3/1994 | Murakami et al. | 369/13 |
| 5,307,336 A | | 4/1994 | Lee et al. | 369/112 |
| 5,377,065 A | | 12/1994 | Morehouse et al. | 360/105 |
| 5,381,402 A | | 1/1995 | Lee et al. | 369/291 |
| 5,408,374 A | | 4/1995 | Morehouse et al. | 360/105 |
| 5,426,562 A | | 6/1995 | Morehouse et al. | 361/685 |
| 5,432,763 A | | 7/1995 | Campbell et al. | 369/44.19 |
| 5,442,266 A | | 8/1995 | Morehouse et al. | 318/272 |
| 5,445,011 A | | 8/1995 | Ghislain et al. | 73/105 |
| 5,450,379 A | | 9/1995 | Fujimori et al. | 369/275.1 |
| 5,450,952 A | * | 9/1995 | Funawatari et al. | 206/308.3 |
| 5,452,283 A | | 9/1995 | Lee et al. | 369/112 |
| 5,467,238 A | | 11/1995 | Lee et al. | 360/128 |
| 5,470,627 A | | 11/1995 | Lee et al. | 428/64.4 |
| 5,481,420 A | | 1/1996 | Cardona et al. | 360/99.06 |
| 5,486,970 A | | 1/1996 | Lee et al. | 360/128 |
| 5,497,359 A | | 3/1996 | Mamin et al. | 369/44.15 |
| 5,531,322 A | * | 7/1996 | Iwaki et al. | 206/308.3 |
| 5,541,888 A | | 7/1996 | Russell | 365/234 |
| 5,558,291 A | | 9/1996 | Anderson | 242/336 |
| 5,570,252 A | | 10/1996 | Sumner et al. | 360/133 |
| 5,572,383 A | | 11/1996 | Hoshi et al. | 360/99.05 |
| 5,579,189 A | | 11/1996 | Morehouse et al. | 360/105 |
| 5,592,349 A | | 1/1997 | Morehouse et al. | 360/98.08 |
| 5,602,819 A | | 2/1997 | Inagaki et al. | 369/99 |
| 5,602,820 A | | 2/1997 | Wickramasinghe et al. | 369/126 |
| D378,518 S | | 3/1997 | Sumner et al. | D14/114 |
| 5,610,779 A | | 3/1997 | Kawana | 360/99.04 |
| 5,610,780 A | | 3/1997 | Nishikawa | 360/99.04 |
| 5,610,782 A | | 3/1997 | Tomoe et al. | 360/99.04 |
| 5,610,891 A | | 3/1997 | Choi | 369/77.2 |
| 5,612,940 A | | 3/1997 | Otsuka et al. | 369/77.2 |
| 5,631,893 A | | 5/1997 | Kang et al. | 369/126 |
| 5,636,095 A | | 6/1997 | McGrath et al. | 360/133 |
| 5,664,991 A | | 9/1997 | Barton, II | 451/65 |
| 5,666,347 A | | 9/1997 | Yoshida et al. | 369/282 |
| 5,671,109 A | | 9/1997 | Sumner et al. | 360/133 |
| 5,671,197 A | | 9/1997 | Matsuda et al. | 369/32 |
| 5,680,276 A | | 10/1997 | Takekado | 360/106 |
| 5,691,860 A | | 11/1997 | Hoppe | 369/97.02 |
| 5,694,278 A | | 12/1997 | Sumner | 360/133 |
| 5,715,233 A | * | 2/1998 | Yoshida et al. | 369/289 |
| 5,724,332 A | * | 3/1998 | Ogusu | 369/77.2 |
| 5,923,630 A | * | 7/1999 | Yoshida et al. | 369/77.2 |
| 6,002,556 A | * | 12/1999 | Oishi | 360/133 |

FOREIGN PATENT DOCUMENTS

| | | | |
|---|---|---|---|
| JP | | 60124076 | 7/1985 |
| JP | | 60169297 | 7/1985 |
| JP | | 6146078 | 3/1986 |
| JP | | 62014388 | 1/1987 |
| JP | | 62031079 | 2/1987 |
| JP | | 62-234282 | * 10/1987 |
| JP | | 51-98155 | 8/1993 |
| JP | | 5-334848 | * 12/1993 |
| JP | | 6-28810 | * 2/1994 |
| JP | | 06076522 | 3/1994 |
| JP | | 06243628 | 9/1994 |
| JP | | 07244950 | 9/1995 |
| JP | | 07262729 | 10/1995 |
| JP | | 10-269737 | * 10/1998 |
| JP | | 10-320952 | * 12/1998 |
| JP | | 10-334630 | * 12/1998 |
| WO | | WO 88/09553 | 12/1988 |
| WO | | WO 94/11873 | 5/1994 |
| WO | | WO 94/29852 | 12/1994 |
| WO | | WO 94/29862 | 12/1994 |

OTHER PUBLICATIONS

Ichimura, Isao et al., "High Density Optical Recording Using a Solid Immersion Lens," Stanford University, G.L. Report No. 5371, Nov. 1995, pp. 4–22 and Figs. 1–17.

Maeda, Fumisada et al., "High Density Optical Disk System Using a New Two–Element Lens and a Thin Substrate Disk," Research Center, Sony Corporation, pps. 342–344.

Kashiwagi, Toshiyuki, "Dual Layer Disk Overview," Jul. 8–12, *Technical Digest*, 1996, vol. 12.

Mamin, H.J., et al., "High Density Optical Recording with a Flying Solid Immersion Lens," presented at the Optical Data Storage Conference in San Diego, California in May, 1995, pp. 1–2.

Rubin, Kurt S., et al., "Volumetric Magneto–Optic Storage on Multiple Recording Surfaces," Jul. 8–12, 1996, *Technical Digest,* 1996, vol. 12.

Rubin, Kurt A., et al., "Multilevel Volumetric Optical Storage," SPIE vol. 2338 *Optical Data Storage,* 1994, pp. 247–253.

Terris, B.D., et al., "Near–field optical data storage using a solid immersion lens," Applied Physics Letters, 65 (4), Jul. 25, 1994, pp. 388–390.

Yamamoto, K., et al., "A 0.8 Numerical Aperture Two Element Objective Lens for the Optical Disk," Research Center, Sony Corporation, Jul. 8–12, 1996.

* cited by examiner

DISK CARTRIDGE WITH DUAL HOUSING STRUCTURE

This application is a continuation-in-part of U.S. application Ser. No. 08/846,916, filed Apr. 29, 1997, now U.S. Pat. No. 6,243,350, the content of which is incorporated herein by reference.

TECHNICAL FIELD

The present invention relates to data storage and, more particularly, to cartridge structures for housing data storage disks.

BACKGROUND INFORMATION

Data storage is an important aspect of today's information technology. A great deal of effort has been made by the storage industry to increase the areal data density of a storage medium in order to meet the ever increasing demand for higher capacity storage devices.

Magnetic storage devices such as fixed or removable magnetic disks and tapes are widely-used conventional storage devices. The state-of-art conventional magnetic hard drive systems can achieve extremely high linear bit densities, especially with the new MR and GMR magnetic heads. For example, the areal density of many hard disk drives is on the order of magnitude of about one gigabit per square inch. One limitation in increasing areal data density in a magnetic device is the particle size or the characteristic dimension of a typical magnetic domain of the magnetic recording materials. Other limitations include the width of the magnetic read/write head and the limitations of mechanical tracking. Therefore, these hard drives are typically limited to less than 10,000 tracks per inch.

Optical storage devices are emerging as an alternative technology to the conventional magnetic technology because of their potential for high density data storage. In optical recording, data is represented as an optically readable domain on a recording medium such as an optical disk. Optically readable data can be recorded on a disk using a variety of mechanical or optical techniques. For example, CD disks typically are prerecorded using mechanical stamping and molding steps. So-called "rite-once" media, such as CD-R disks, can be recorded permanently with optical techniques to record particular data. As an alternative to permanent recording, magneto-optic and phase change disks allow data to be recorded in an "erasable" or "rewritable" manner. DVD disks, for example, can provide prerecorded content or be configured for rewritable recording by an end user.

Optical storage disks and, in particular, magneto-optical disks offer greatly increased data storage capacity relative to other disk media, such as magnetic disks. The storage capacity for a given optical disk depends on the recording area of the disk and the areal density of domains recorded over the recording area. The recording area of a disk ordinarily is limited by physical requirements such as size and weight for minimal footprint and ease of portability. Accordingly, the pursuit of greater storage capacity has focused primarily on increased areal density over a given recording area. Optical recording offers relatively high areal density capabilities, but has been limited by the spot size of the optical beam used for read and write operations. In other words, areal density remains a function of the ability of the write and read beams to address increasingly smaller domains on the disk surface.

The areal density of an optical storage device, in principle, is only limited by the diffraction limit of an illuminating optical beam for reading or writing. One type of commercial optical storage technology is based on magneto-optical materials. These materials can currently produce an areal data density of about one gigabit per square inch. One well-known approach to increase the areal data density in an optical storage system is using smaller beam size. Due to the diffraction limit, this may be achieved by using a light source with shorter wavelengths such as those toward the blue end of the spectrum. For example, one application for the industrial development of compact blue lasers is aimed at the optical storage. Alternatively, one may increase the numerical aperture of the objective lens in the system to focus a beam at a given wavelength to a smaller spot within the diffraction limit.

SUMMARY

The present invention is directed to a data storage disk cartridge having a dual housing structure, and to techniques for limiting the effects of debris in a data storage system. The disk cartridge includes an inner housing that contains the disk, and an outer housing that contains the inner housing. The inner housing is at least partially removable from the outer housing for insertion into a disk drive. The outer housing remains external to the disk drive, however, except for a portion that is inserted into the drive to provide a docking channel for removal of the inner housing. A shutter on the inner housing covers a portion of the disk, and is manipulable by the disk drive to uncover the disk and allow access by the drive head. The dual housing structure of the cartridge can significantly improve disk and drive reliability, especially for recording applications that require higher areal recording densities or reduced air gaps between the disk and the drive head. In particular, the disk cartridge reduces the accumulation of debris on the disk and drive components. The reduced amounts of debris contribute to more consistent performance of the disk and drive, and thereby enhance data storage reliability. For optical disks and drives, in particular, reduced amounts of debris are important for reliable optical and mechanical performance.

Debris is a significant concern in data recording systems. Debris can degrade the optical performance of an optical disk or the components of an optical drive. Debris that accumulates on the optical components of a drive, for example, can attenuate the intensity of the beams used for read or write operations. Consequently, the optical components can deliver a beam with insufficient energy, imprecise spot size, or misregistered addressing. Accumulation of debris on the disk can cause loss of tracking as well as attenuation of read and write beam energy. Debris can also cause disk tilt and, in some cases, drive head crashes. With substantial amounts of debris, disk or drive failure can occur, leading to data loss and repair costs.

The debris problem becomes more pronounced as areal density increases in an optical recording system. Optical disks with lower areal densities ordinarily tolerate some degree of optical error, and therefore are not as greatly impacted by debris. Also, to the extent that optical error is a concern, conventional recording drives typically make use of focus adjustment, interleaved data formats, and error correction. At higher areal densities, however, debris can impair the ability of the drive laser to consistently write and read to and from individual domains on the disk despite such measures. In other words, the more aggressive areal densities required by newer recording techniques may offer very little tolerance for optical error induced by debris. Accordingly, the absence of debris is a critical concern in high density optical recording applications.

An example of an optical recording application with extremely high areal density requirements is near field recording. Near field recording is one form of optical recording that is capable of producing extremely small spot sizes, for example, on magneto-optic disk media. For near field recording, a solid immersion lens (SIL) can be used to transmit an optical beam across an extremely thin air bearing, and through the top of the recording medium to the recording layer. The beam is "air-incident" in the sense that it does not pass through the disk substrate before it reaches the recording layer. This aspect of near field recording differs from the substrate-incident techniques used in conventional magneto-optic recording, in which the beam passes through the substrate. A SIL can be integrated with a flying magnetic head assembly that hovers above the disk during operation and provides the magnetic bias for magneto-optic recording. For near-field recording, the thickness of the air gap is less than one wavelength of the recording beam. Transmission of the beam is accomplished by a phenomenon known as evanescent coupling, which results in extremely small spot sizes.

As an example, the near field recording technique is expected to offer storage in the range of 10 to 20 gigabytes (GB), and higher, e.g., for optical disks having diameters in the range of 120 to 130 millimeters (mm). Resulting domain sizes may approach, for example, 0.05 to 0.06 square microns per data domain. In dual-sided recording applications, the above figures pertain to each side of the disk. Near field recording, with increased areal density, is more susceptible to the performance problems caused by debris. Debris can affect not only optical performance, but also mechanical performance. With existing disk cartridges, debris can be carried into the drive on the surface of the cartridge. Also, debris can accumulate on the disk surface when the shutter is opened outside of the drive. As a result, debris in the form of dust, lint, or fingerprints can accumulate on the surface of the disk.

The debris problem can be aggravated by the physical characteristics of the near field recording process. Specifically, the beam is emitted across the extremely thin air bearing that separates the lens from the disk. The air gap is less than a single wavelength of the incident beam to take advantage of the phenomenon referred to as evanescent coupling. Variation in the air bearing thickness can result in varying focus and spot size across the disk. In particular, the thickness of the air gap determines the amount of radiation received by the recording layer via evanescent coupling. Significant variation in spot size and focus can undermine the ability of the laser to consistently address extremely small domains. Excessive amounts of debris on the disk can cause acute changes in air bearing thickness for successive domains and resultant loss of tracking. In extreme cases, head crashes, i.e., physical contact of the head with the disk, can result. In this manner, debris can compromise the mechanical performance of the near field recording system. Debris-induced head crashes are also a concern in other types of recording applications involving small air gaps between the disk and the drive head.

To alleviate the problems of debris in an optical recording system, and particularly in a near field recording system, the dual-housing disk cartridge of the present invention provides a system of partially redundant barriers that significantly reduce the possibility of debris accumulation. The barriers form a hierarchy of cleanliness, much like a clean room environment. The barriers isolate the disk and drive components from the outside environment. In one embodiment, the disk is never exposed to the outside environment. The inner housing in the cartridge provides a main line of defense against the accumulation of debris on the disk. The inner housing encloses the disk and includes a shutter that preferably is opened only by the disk drive. To that end, the inner housing may include a locking mechanism that is manipulable by the disk drive to obtain access to the disk. The shutter also can be spring biased in a closed position. In one embodiment, the shutter can be loaded by a spring that is selectively loaded in a ratcheted matter to preset a desired spring bias. Further, even if the shutter locking mechanism is somehow defeated, the disk cartridge includes the outer housing, which contains the inner housing. In this manner, the outer housing protects the exterior surface of the inner housing from debris.

The inner housing preferably is configured such that it can be removed only by the disk drive. In particular, it is desirable that the inner housing only be removable when the outer housing is partially inserted into the drive. The outer housing provides a docking channel for insertion of the inner housing into the drive. The major portion of the outer housing remains external to the drive, however, preventing introduction of debris from the outer housing into the drive. A second locking mechanism can be provided for general protection against removal of the inner housing from the outer housing. In addition, the outer housing can be equipped with doors that close off the inner housing absent engagement by the drive. With this combination of features in a preferred embodiment, the inner housing and the enclosed disk are never exposed to the environment outside of the drive.

In particular, in a preferred embodiment, the disk and inner housing are never touched by human hands. Instead, the outer housing acts as a special carrier for the disk and inner housing, and allows implementation of a docking station with the drive. In loading a disk, the carrier is temporarily docked to the drive. The carrier door is then opened and the cartridge is automatically removed from the carrier and transferred into the disk drive. In this embodiment, the empty carrier can be removed from the disk drive. In unloading a disk, an empty carrier is temporarily docked to the drive. The docking system automatically transfers the cartridge from the disk drive to the carrier. The cartridge enclosed in the carrier is then removed from the disk drive. The carrier door remains closed if the carrier is not docked to the disk drive. A disk cartridge in accordance with an embodiment of the present invention thereby provides an added measure against the collection of debris on the disk, and also prevents collection of debris on the exterior of the inner housing. As a result, the cartridge is much less likely to introduce debris into the drive, protecting the optical and flying head components of the drive against such debris.

A number of additional features and advantages that further contribute to debris prevention and, in some cases, durability and manufacturability, can be realized by a cartridge according to the present invention. For example, the inner housing can be constructed such that only the hub on which the disk is mounted is accessible by the disk drive to rotate the disk. In other words, in one embodiment, the drive accesses only the hub and not the inner diameter of the disk. Accordingly, the portions of the disk forming the inner diameter at which the hub is mounted preferably are not exposed to the environment outside of the inner housing. Instead, the disk drive engages the hub alone for rotation of the disk, e.g., by a magnetic clutch and spindle motor. As an alternative, the disk may be manufactured without a hub and rotated directly at a central position with a rotating mechanical chuck.

Further, containment of the inner housing within the outer housing serves to protect the hub from debris. Accumulation of debris on the surface of the hub can cause disk tilt, potentially harming optical and mechanical performance. Debris can reduce the coefficient of friction between the hub and spindle motor rotating the hub. Reduced friction can cause the hub to slip on the spindle, particularly during the rapid acceleration to operating speed. Debris on the hub can be centrifuged outward onto the disk surface during operation, leading to air gap variations across the surface of the disk. The air gap variations can result in diminished optical performance and head crashes.

In addition to providing protection against debris, an inner housing can contribute a mechanical damping effect that stabilizes the disk against vibrations, whether induced during rotation or caused externally. This effect is particularly advantageous for disks with substrates manufactured from less rigid materials such as plastic. In a preferred embodiment, the disk is permanently housed in the inner housing, even during rotation and drive head access. Although the shutter is opened to provide disk access, the remainder of the inner housing substantially encloses the disk, providing a tight shroud-like enclosure. The clearance between the disk and this enclosure provides a damping system that stabilizes the disk against vibration. Specifically, the inner housing provides air damping between the disk and the inner surfaces of the inner housing. The air tends to resist deflection, deformation, or movement of the disk during rotation, acting to dampen vibration. In this manner, the inner housing is capable of reducing vibration amplitude and associated disk movement to help maintain optical and mechanical performance in the recording system. This damping effect also can reduce the magnetic chucking force required to hold the disk onto the spindle. In particular, the air damping counteracts the tendency of the disk to fly away from the spindle motor, e.g., in response to shock loads. Also, the air damping is effective in reducing tilt of the disk surface.

The shutter and the portion of the inner housing adjacent the shutter can be formed from different materials that are selected to minimize the generation of debris due to abrasion during shutter movement. The inner housing and shutter materials, as well as the outer housing material, also can be selected for effective thermal matching to avoid undesirable degrees of differential deformation during use. Further, guide rails can be incorporated in the outer housing to facilitate retraction of the inner housing. The guide rails and inner housing, as well as the outer housing if desired, can be fabricated from different materials to minimize the generation of debris during retraction.

The shutter can be mounted for movement over the exterior of the inner housing, if desired, thereby enhancing the pinch strength of the housing, minimizing the introduction of debris into the interior of the inner housing, and facilitating shutter installation. The outer housing may include a structure that abuts with the disk drive upon insertion of the cartridge, thereby controlling the depth of insertion to minimize the passage of debris. In addition, the inner housing may incorporate a filter that captures any debris that may flow through the inner housing, and particularly the debris directed to the disk periphery by the centrifugal forces created during spin-up of the disk. Further, brush, vacuum, or other debris removal devices may be provided in the drive to remove debris from the leading portion of the cartridge upon insertion into the drive. Also, a bias mechanism can be provided in the inner housing to bias the hub against an opening in the inner housing through which the hub is accessed by a drive clutch and spindle motor. The biased hub thereby acts to substantially seal the hub opening against the introduction of debris into the inner housing. If desired, the bias mechanism can be constructed with a ratcheting structure that allows the bias load to be preset during manufacturing.

In one embodiment, the present invention provides a data storage disk cartridge, the cartridge comprising an inner housing configured to receive a disk; and an outer housing configured to receive the inner housing, and to allow at least partial removal of the inner housing from the outer housing.

In another embodiment, the present invention provides an optical data storage disk cartridge comprising an optical data storage disk, an inner housing containing the disk, an outer housing containing the inner housing, wherein the outer housing is configured to allow at least partial removal of the inner housing from the outer housing, an access area formed in the inner housing to allow access to the disk, a shutter mounted on the inner housing, the shutter being movable to cover and uncover the access area, and a hub mounted in the disk, wherein a portion of the hub is accessible through the inner housing for access by the disk drive, the hub being rotatable by the disk drive to rotate the disk.

In a further embodiment, the present invention provides a data storage disk cartridge comprising a housing configured to receive a disk, a shutter mounted on the housing, the shutter being rotatable to cover and uncover an access area adjacent the disk, thereby allowing a disk drive to access the disk, wherein the shutter is mounted to rotate over an exterior surface of the housing, and a hub mounted in a central area of the disk, wherein a portion of the hub is accessible through the inner housing for access by the disk drive, the hub being rotatable by the disk drive to rotate the disk.

In an added embodiment, the present invention provides a housing for a data storage disk comprising a first major surface, a second major surface, first, second, and third side surfaces extending between the first and second major surfaces, and a slot formed opposite one of the side surfaces for receiving a second housing containing a data storage disk, wherein the. first major surface includes a major portion, a nose portion, and a transition portion defining an interface between the major portion and the nose portion, wherein the major portion and nose portion are sized such that at least the transition region defines a surface that is abuttable with a surface on the disk drive upon insertion of the nose portion into the disk drive, thereby limiting insertion of the housing.

In another embodiment, the present invention a data storage disk cartridge, the cartridge comprising an inner housing including an area to receive a disk and defining an access area, wherein the inner housing includes an identification area configured to carry a visual identification, a shutter that covers the access area, the shutter being movable to uncover the access area to allow access to the disk, an outer housing including an area to receive the inner housing, wherein the outer housing is configured to allow at least partial removal of the inner housing from the outer housing to allow the disk to be accessed by a disk drive, and wherein at least a portion of the outer housing is sufficiently transparent to allow visibility of the identification area of the inner housing from outside the outer housing.

In a further embodiment, the present invention provides a near field recording system comprising a cartridge including an optical data storage disk, an inner housing containing the disk, a shutter that is movable to allow access to the disk, and an outer housing containing the inner housing, wherein the inner housing is at least partially removable from the outer housing, and a disk drive including a mechanism that moves the inner housing relative to the outer housing and moving the shutter to access the disk, and a near field recording head assembly having a solid immersion lens that transmits a beam of radiation to record data on the disk via evanescent coupling.

In an additional embodiment, the present invention provides a method for protecting a disk from debris comprising housing the disk in an inner housing, housing the inner housing in an outer housing, and allowing removal of the inner housing from the outer housing only upon insertion of a portion of the outer housing into a data storage drive.

In a further embodiment, the present invention provides a method for protecting a data storage disk drive from debris, the method comprising housing a disk in an inner housing, housing the inner housing in an outer housing, and accessing the disk such that the inner housing is generally unexposed to any environment outside of either the outer housing or the disk drive.

In another embodiment, the present invention provides a data storage disk cartridge comprising a disk, and a housing structure having a plurality of enclosures arranged such that the disk is generally unexposed to any environment outside of either the housing structure or a disk drive.

In an added embodiment, the present invention provides an optical data storage disk cartridge comprising a optical disk, an inner housing containing the optical disk, an outer housing containing the inner housing, wherein the outer housing defines a slot for at least partial removal of the inner housing from the outer housing, a rotary shutter mounted over an exterior surface of the inner housing, the shutter being rotatable to cover and uncover the optical disk for access by a data storage drive, and a structure formed on the inner housing for engagement with an element in a disk drive to thereby allow at least partial removal of the inner housing from the outer housing.

In a further embodiment, the present invention provides a bias mechanism for a rotary shutter for a data storage disk cartridge, the rotary shutter having at least one mounting structure rotatably mounted to the disk cartridge, the bias mechanism comprising a spring having a first end, a first spring tail at the first end, and a second spring tail at the second end, a first pair of mounting posts coupled to rotate with the mounting structure of the shutter, each of the first pair of mounting posts engaging the spring at the first end on opposite sides of the first spring tail, and a second pair of mounting posts fixed to the cartridge, each of the mounting posts engaging the spring at the second end on opposite sides of the second spring tail, wherein the spring is rotationally loaded such that the second spring tail bears against at least one of the first pair of mounting posts and such that the first spring tail bears against at least one of the second pair of mounting posts, the spring thereby exerting a spring bias against the first mounting posts and against the shutter to bias the shutter toward a closed position.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
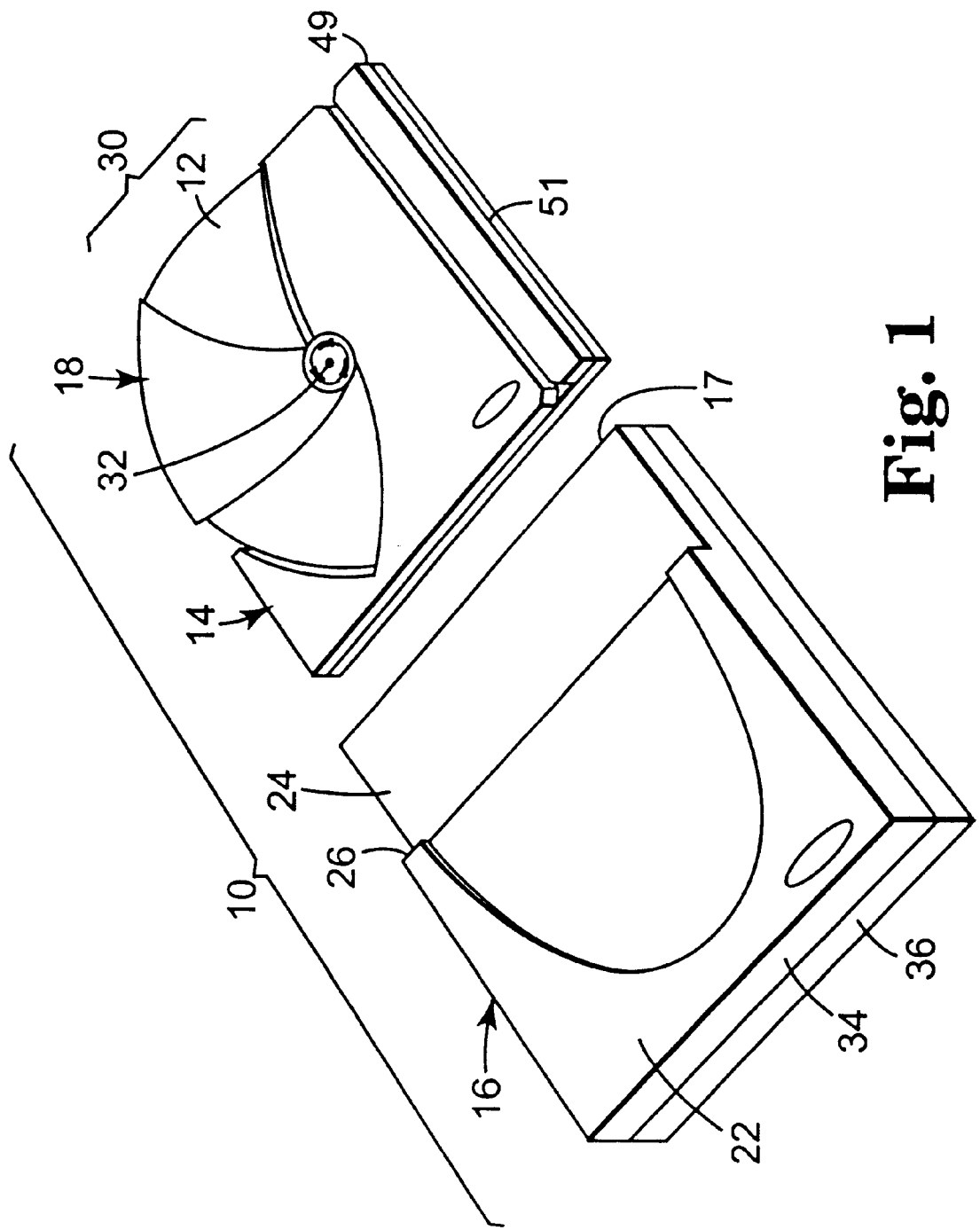
FIG. 1 is a perspective view of an optical disk cartridge in accordance with an embodiment of the present invention.

FIG. 1 shows a disk cartridge 10 having a dual housing structure in accordance with an embodiment of the present invention. As shown in FIG. 1, cartridge 10 includes a disk 12, an inner housing 14 that contains the disk, and an outer housing 16 that contains the inner housing. During storage or transport, outer housing 16 protects inner housing 14 and disk 12 from debris. To allow a disk drive to access disk 12, however, inner housing 14 is at least partially removable from outer housing 16. In particular, inner housing 14 can be retracted through one end 17 of outer housing 16. Cartridge 10 is useful in a variety of recording applications, but is particularly advantageous for optical recording applications involving high areal densities and accompanying sensitivity to debris.

Inner housing 14 includes a shutter 18 that is movable to uncover a section of disk 12 for access by read/write components associated with the disk drive. During retraction, inner housing 14 and shutter 18 protect disk 12 from debris that could undermine the optical and mechanical performance of the disk. At the same time, inner housing 14 is configured for removal from outer housing 16 simultaneously with insertion of the inner housing into a disk drive. In other words, inner housing 14 is inserted directly into the disk drive without exposure to the environment outside of outer housing 16. In this manner, cartridge 10 prevents inner housing 14 from introducing debris that could adversely affect the performance of optical components within the disk drive. Cartridge 10 is particularly useful for disks and recording techniques that require high areal densities or small head fly heights. Small head fly heights and debris-induced head crashes can be a concern in both optical and magnetic recording applications.

Disk 12 may comprise any of a variety of prerecorded or rewritable disk media with a variety of form factors and formats. In particular, disk 12 may comprise any of a variety of optical disks including magneto-optic, phase change, CD, CD-ROM, CD-R, or DVD disks. Disk 12 may have any of a variety of conventional or novel formats suitable for audio, video, or data recording. Examples of conventional formats include CD, CD-R, CD-ROM, DVD, DVD-ROM, DVD-RAM, and the various MO and phase change, or PD, formats. Also, disk 12 may conform to different form factors such as 2.5 inch, 3.5 inch, 5.25 inch, 120 mm, and 130 mm. As one example, disk 12 may be an optical disk useful in near field recording. In particular, disk 12 may be a magneto-optical disk. In this example, disk 12 may include, in order, a substrate, reflective layer, first dielectric layer, magneto-optic recording layer, and second dielectric layer. For near field recording, data on disk 12 preferably is accessed from a side opposite the substrate, i.e., the near side of the disk relative to the head position. In other words, in this configuration, disk 12 is oriented for air-incident access in which the read and/or write beam does not enter recording layer through the substrate, but through the second dielectric layer. With near-field, air-incident recording techniques, disk 12 may be configured, for example, to store data at domains having areas on the order of 0.05 to 0.06 square microns or less. The substantial reductions in debris afforded by cartridge 10 can greatly enhance the reliability of such a recording process.

Figure 2:
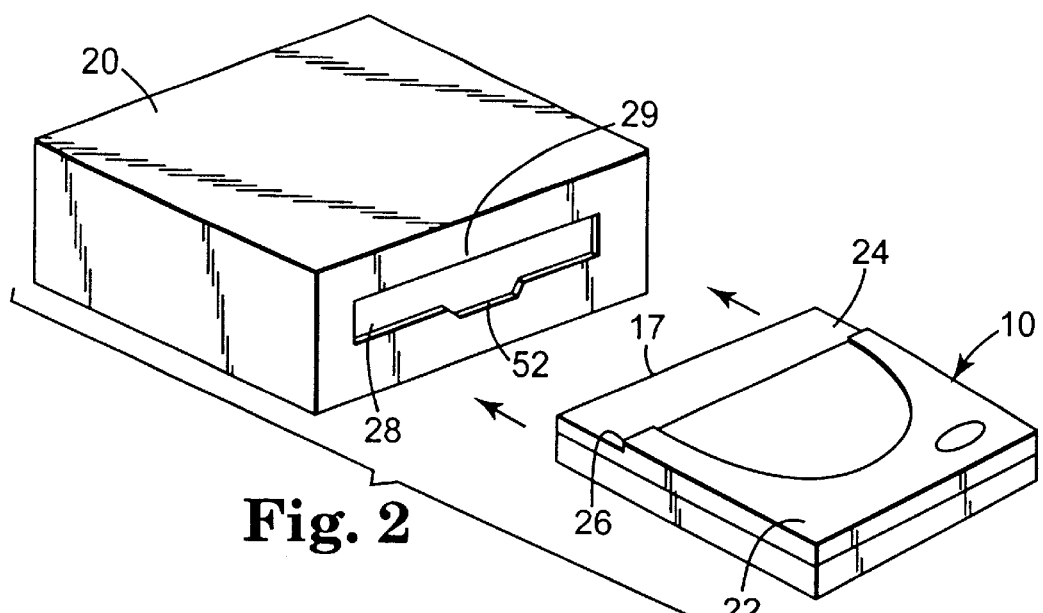
FIGS. 2–4 are perspective views illustrating the insertion of an optical disk cartridge as shown in FIG. 1 into a disk drive.
Figure 3:
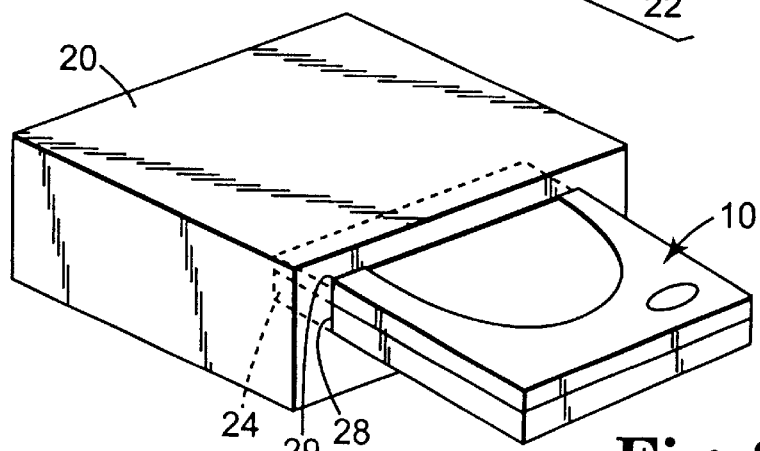
Figure 4:
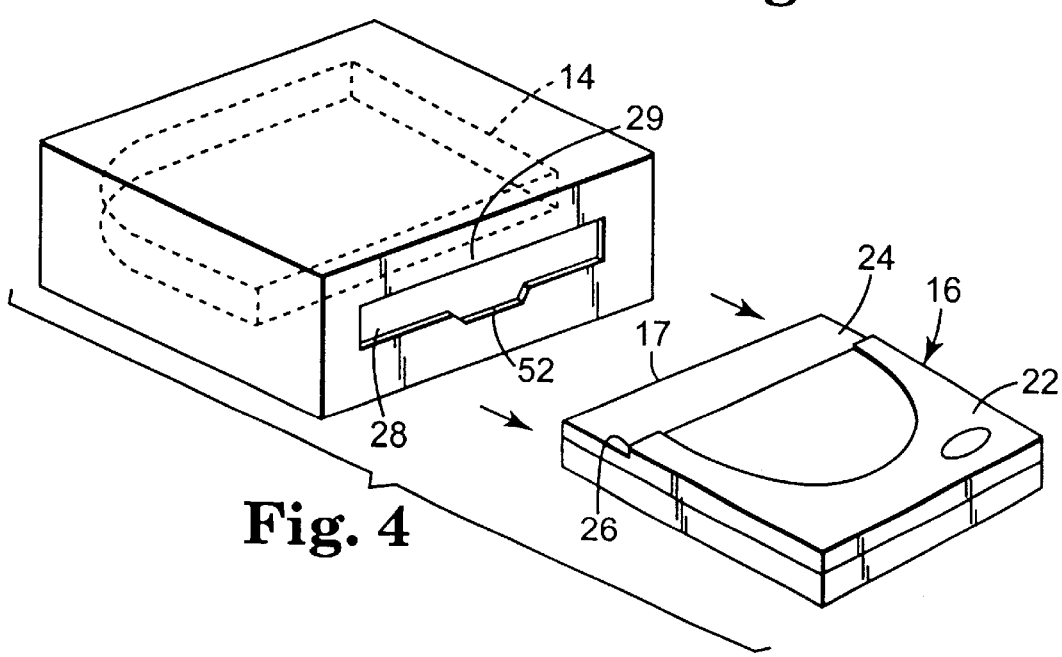

FIGS. 2, 3, and 4 illustrate the removal of inner housing 14 from outer housing 16 and simultaneous insertion of the inner housing into a disk drive 20. Although cartridge 10 and disk drive 20 are illustrated in FIGS. 2–4 in a stand-alone application, cartridge 10 can be readily configured for library applications. Specifically, outer housing 16 can be provided with detents, protrusions, or other surface features to facilitate manipulation, e.g., storage and retrieval, by picker equipment associated with multi-cartridge library systems. However, the stand-alone application illustrated by FIGS. 2–4 will be described for purposes of example. In a library or stand-alone application, inner housing 14 and/or outer housing 16 may include one or more identification structures, such as holes, that are engaged by a drive to determine an identity or configuration of disk 12, e.g., two-sided, read-only, format, high density, etc. With reference to FIG. 2, to allow retraction of inner housing 14 without significant exposure to debris, outer housing 16 is structured for partial insertion into disk drive 20. In particular, as shown in FIG. 2, outer housing 16 includes a major section 22 and a leading, or "nose" section 24. An interface between major section 22 and nose section 24 defines a transition section 26. For retraction of inner housing 14, nose section 24 is inserted into an appropriately sized slot 28 in disk drive 20. Nose section 24 can be beveled at its leading edge to facilitate insertion into slot 28.

Major section 22 and nose section 24 are sized relative to one another such that transition section 26 has a height that is greater than the height of slot 28. In other words, the dimension of nose section 24 is smaller than that of major section 22, thereby defining a "shoulder" that is formed at the interface therebetween in transition section 26. In this manner, the shoulder defined by transition section 26 provides an abutting surface that abuts with an outer surface of a front panel 29 of drive 20. As shown in FIG. 3, for example, transition section 26 abuts with front panel 29 of disk drive 20 adjacent drive slot 28, limiting the depth of insertion of outer housing 16. Nose section 24 serves as a docking channel for insertion of inner housing 14 into drive 20. Upon insertion of nose section 24 into drive slot 28, a retraction mechanism (not shown) within drive 20 retracts inner housing 14 from outer housing 16, along with disk 12. With nose section 24, inner housing 14 is inserted directly into drive 20 without exposure to the outside environment. Specifically, inner housing 14 is drawn into drive 20 via nose section 24, which bridges the gap between major section 22 and the drive, isolating the inner housing from the outside environment. Thus, nose section 24 prevents inner housing 14 from carrying debris into drive 20, providing another level of protection against debris. Slot 28 preferably is designed to fit closely around nose section 24 and is smaller than the shoulder defined by transition section 26. In this way, the shoulder around nose section 24 functions as a stop and is in contact with the front of drive 20 when outer housing 16 is inserted into the drive. Nose section 24 can have a predetermined length, e.g., about 40 mm, so that when outer housing 16 is inserted into slot 28, it can be accurately located and self-supporting.

Following retraction of inner housing 14, outer housing 16 can be removed from drive slot 28, as shown in FIG. 4, or remain in its partially inserted position. In either case, inner housing 14 is fully contained within drive 20 and remains protected against outside debris. Temporary docking of outer housing 16 in drive slot 28 may be desirable to avoid footprint consumption due to the protrusion of the outer housing from drive 20. In this case, it may be desirable to provide a door system in drive 20. For example, upon insertion of nose section 24 of outer housing 16 into drive slot 28, a cartridge lock mechanism (not shown) in the drive can be actuated to lock the outer housing into the drive. A switch or sensor (not shown) provides a signal to drive 20 that a cartridge has been installed. A mechanism (not shown) in drive 20 then opens a door in outer housing 16 and transfers inner housing 14 from the outer housing, or "carrier," into drive 20. The lock mechanism then unlocks outer housing 16.

When outer housing 16 is unlocked, it can be removed from drive 20. Upon retraction of inner housing 14 and removal of nose section 24 from drive slot 28, the inner door can be closed to seal drive 20. In this manner, drive 20 can be sealed to avoid exposure to the outside environment. For disk drive access, shutter 18 is movable between open and closed positions to uncover and cover, respectively, an access area 30 adjacent a section of disk 12, shown in FIG. 1. Shutter 18 can be formed in a rotary configuration to rotate about a central mounting point 32. To minimize the introduction of debris, shutter 18 preferably is movable to the open position only when inner housing 14 is inserted into the disk drive. For operation, the retracted inner housing 14 is accessed by appropriate components within drive 20 to spin up disk 12 and move shutter 18 to its open position for access to the disk. When inner housing 14 is transferred from outer housing 16 into drive 20, shutter 18 can remain closed until the inner housing is lowered onto a spindle motor (not shown) and disk 12 has been brought to operating speed. Spinning disk 12 in closed inner housing 14 enhances the pumping action of the disk, which forces air through filter, to be described, thereby cleaning the disk and the inside of the inner housing. After this optional cleaning phase, shutter 18 is opened to expose disk 12, and one or more read/write heads can be loaded to access the disk.

In unloading inner housing 14 from drive 20, a user can push a button or otherwise notify the drive. After the door opens, the user inserts an empty outer housing 16 into drive 20. Drive 20 moves inner housing 14 into outer housing 16. Then, after outer housing 16 has been removed from drive 20, the door closes and seals the drive. To unload inner housing 14, drive 20 unloads the heads from disk 12, spins down, i.e., stops the rotation of disk 12, disengages the disk from the spindle motor and opens the door of the drive. Drive 20, with an unloading mechanism, raises inner housing 14 up off the spindle motor and pushes the inner housing back into outer housing 16. In one embodiment, if outer housing 16 has been removed from drive 20, it can be reinserted to retrieve inner housing 14 after disk 12 has been spun down, i.e., disk rotation has stopped.

During retraction from drive 20, as in the insertion mode, inner housing 14 is protected from debris by nose section 24. Outer housing 16 is then withdrawn from drive slot 28, along with inner housing 14 and disk 12, for storage or transport. With outer housing 16, inner housing 14, and shutter 18, disk 12 benefits from several redundant barriers against debris during retraction and insertion of inner housing 14 relative to the outer housing. The barriers form a hierarchy of cleanliness, isolating inner disk 12 from the outside environment. In this manner, cartridge 10 is capable of enhancing the reliability of disk 12 and drive 20, particularly for recording applications, such as near field recording, that rely on increased areal storage densities.

Figure 5:
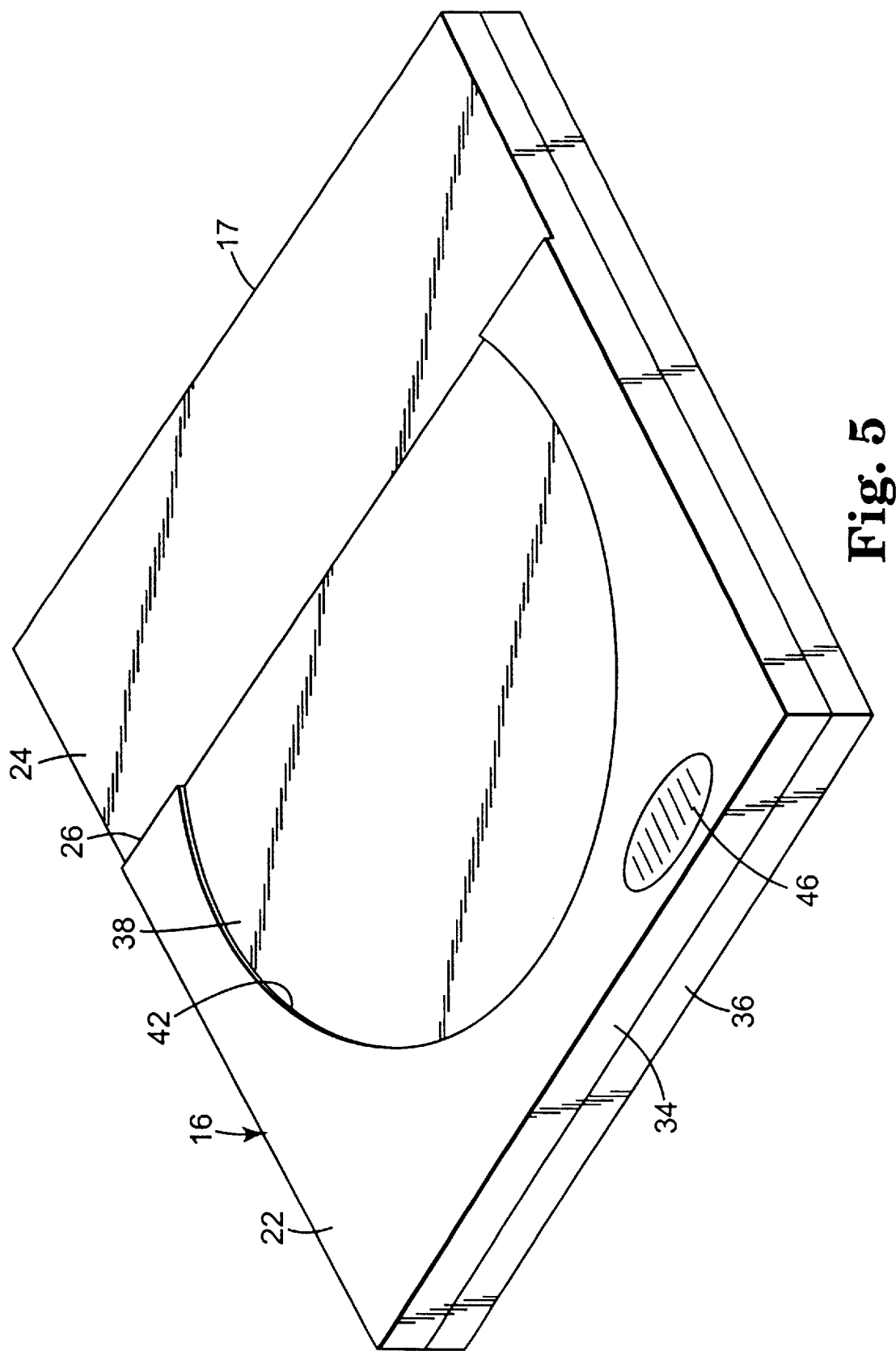
FIGS. 5 and 6 are perspective exterior views from opposite sides of an outer housing forming part of an optical disk cartridge as shown in FIG. 1.
Figure 6:
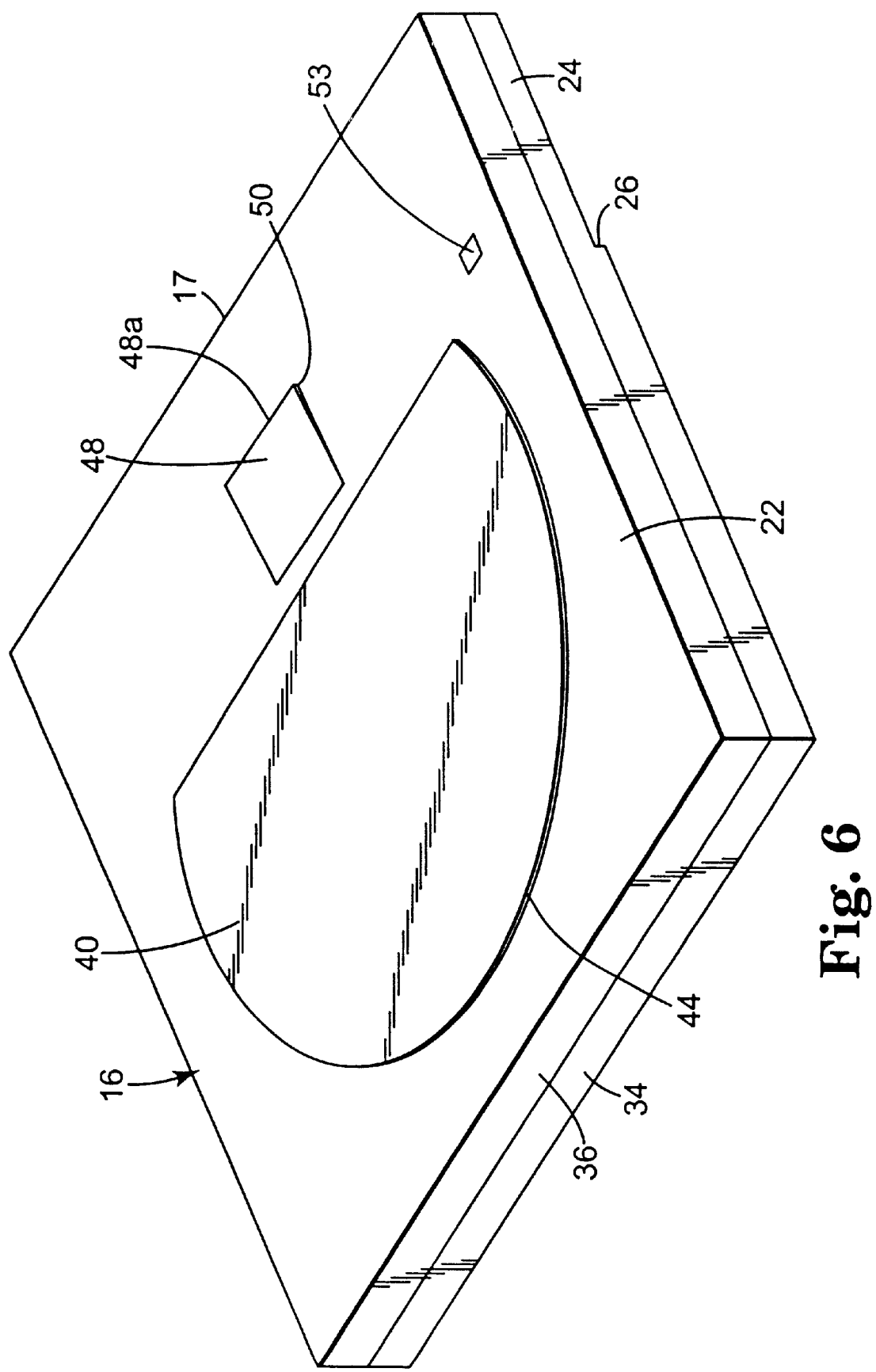

FIGS. 5 and 6 provide top and bottom views, respectively, that illustrate outer housing 16 in greater detail. As shown in FIGS. 5 and 6, outer housing 16 may include a top half 34 and a bottom half 36 that are joined together to form an enclosure for inner housing 14. Top and bottom halves 34, 36 can be formed from a variety of materials. In particular, halves 34, 36 may be formed from different materials or a common material. Fabrication of both halves 34, 36 from a common material provides thermal matching, however, to minimize excessive degrees of differential deformation that can cause deviation from necessary structural tolerances. For light weight, ease of fabrication, and structural strength, top and bottom halves 34, 36 preferably are formed from an injection molded engineering plastic. An example of a suitable plastic material is polycarbonate. Polycarbonate is an example of a material that is readily susceptible to fabrication by molding and provides sufficient rigidity per unit weight to protect inner housing 14 from damage due to droppage or compression. The use of polycarbonate is also advantageous in terms of its transmissivity to light, as will be explained. Top and bottom halves 34, 36 can be joined together using a variety of techniques including adhesive bonding, ultrasonic welding, screws, and compression or snap fitting.

As shown in FIG. 5, to facilitate the stacking of several cartridges during storage or shipment, outer housing 16 may include a recessed area 38 formed in major section 22 of top half 34. Similarly, with reference to FIG. 6, outer housing 16 may include a complementary shaped raised area 40 in major section 22 of bottom half 36. Recessed area 38 is configured to receive a reciprocally formed raised area 40 of another cartridge. Specifically, when several cartridges are stacked, the recessed and raised areas of adjacent cartridges engage one another. Walls 42, 44 defined by raised and recessed areas, 38, 40, respectively, provide surfaces that bear against one another to resist displacement of the cartridges in a direction transverse to the stacking direction, e.g., horizontal displacement. In this way, the stack is resistant to inadvertent contact. Raised and recessed areas 38, 40 thereby facilitate stacking registration of cartridges with one another, and enhance the structural integrity of the stack. At the same time, however, walls 42, 44 should be sufficiently shallow to enable intentional withdrawal of a cartridge by an end user without significant effort. In the example of FIGS. 5 and 6, areas 38, 40 are substantially hemispherically shaped. Areas 38, 40 can take a variety of shapes and depths, subject to surface area and depth limitations. If depth is limited, it may be desirable that areas 38, 40 be sized larger to enhance the overall length of engagement and resulting force between walls 42, 44.

Figure 7:
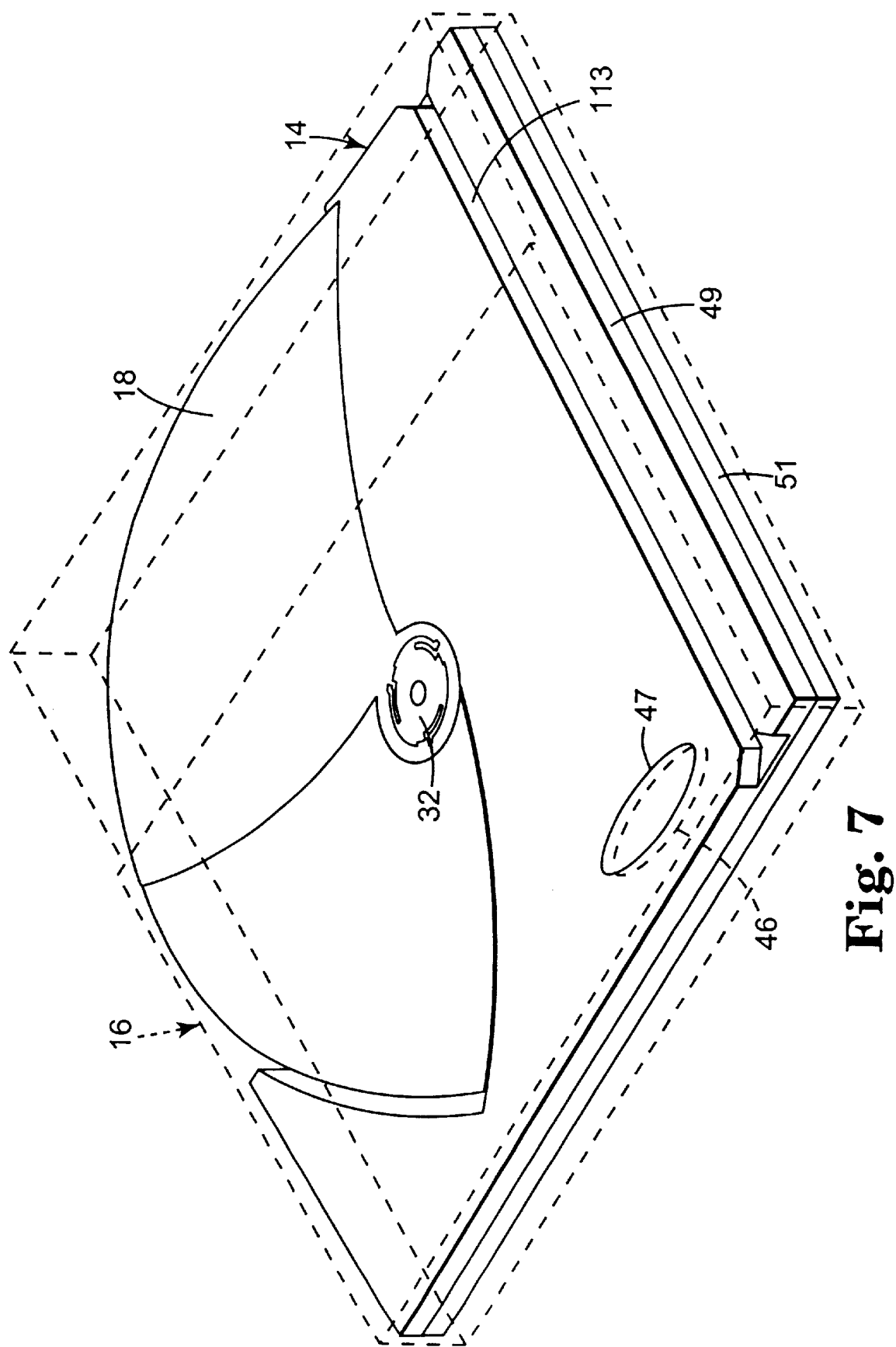
FIG. 7 is a perspective view of a cartridge as shown in FIG. 1 with an inner housing contained within the outer housing.

As further shown in FIG. 5, top half 34 may include a viewing window 46 that allows an identification area formed on inner housing 14 to be viewed from outside outer housing 16. FIG. 7 shows inner housing 14 contained within outer housing 16, the latter represented with dotted lines, and illustrates an identification area 47 formed on the inner housing. As also shown in FIG. 7, inner housing 14 may include a top half 49 and bottom half 51 that are joined together, for example, by adhesive bonding, ultrasonic welding, screws, compression or snap fitting. Identification area 47 can be formed on top half 49 by a variety of techniques including etching, hot stamping, printing, or adhesive labeling. Slide-in labels also could be used provided that appropriate detents are molded into identification area 47 to receive and retain a label. The identification formed in identification area 47 can take a variety of forms including, for example, an alphanumeric code, barcode, or human-readable title.

Viewing window 46 allows identification area 47 to be viewed by the end user or by an automated reader to enable ease of identification of a desired disk. In most cases, outer housing 16 will bear an identification that matches that of inner housing 14 such that the same outer housing is always used with a particular inner housing and disk. Viewing window 46 can be formed by forming an aperture in top half 34 and mounting a transparent window member in the aperture, for example, by adhesive bonding. To simplify fabrication, however, viewing window 46 preferably is formed during the molding process. Specifically, top half 34 can be formed by a substantially light transmissive material such as polycarbonate. With a partially transmissive material, viewing window 46 can be formed by molding top half 34 with a reduced thickness at the position of the window. The window can be highly polished to minimize diffusion, thereby enhancing visibility. In this manner, the portion of top half 34 coincident with viewing window 46 is made sufficiently transparent to allow viewing of identification area 47 on inner housing 14. Alternatively, the entire outer housing 16 can be transparent. In the example of FIG. 5, viewing window 46 is formed in the shape of an oval and positioned near a corner of top half 34. However, the shape and positioning of viewing window 46 is subject to significant variation provided the end user or automated reader is capable of readily resolving identification area 47 on inner housing 14.

With further reference to FIG. 6, bottom half 36 of outer housing 16 may include a key structure 48 that prevents nose section 24 from being inserted into disk drive 20 in an "upside-down" orientation. Specifically, key structure 48 includes a leading edge 50 that is raised relative to nose section 24. When nose section 24 is inserted into disk drive 20 in a proper orientation, key structure 48 preferably engages a reciprocally formed key groove 52 in drive slot 28. Groove 52 receives key structure 48 in a slidable manner and allows continued insertion of nose section 24 into drive 20. As further shown in FIG. 6, bottom half 36 may include a notch or recessed area 53 for engagement with a locking mechanism in drive 20. In some embodiments, bottom half 36 of outer housing 16 may include two or more key structures. Similarly, drive 20 then may include two or more reciprocal key grooves.

In the event an attempt is made to insert nose section 24 in an upside-down orientation, i.e., with top half 34 facing downward and bottom half 36 facing upward, a leading stop surface 48a defined by key structure 48 abuts with front panel 29 of drive 20. This abutment between key structure 48 and panel 29 prevents further insertion of nose section 24 into disk drive 20 and, in effect, notifies the end user of the improper orientation. Key structure 48 can be readily formed during the molding of bottom half 36 and preferably has a profile sufficient to prevent improper insertion without significantly affecting the stackability of cartridge 10. A reciprocally formed recess can be provided in top half 34 of each of the outer housings 16 to receive the key structures of adjacent cartridges.

Figure 8:
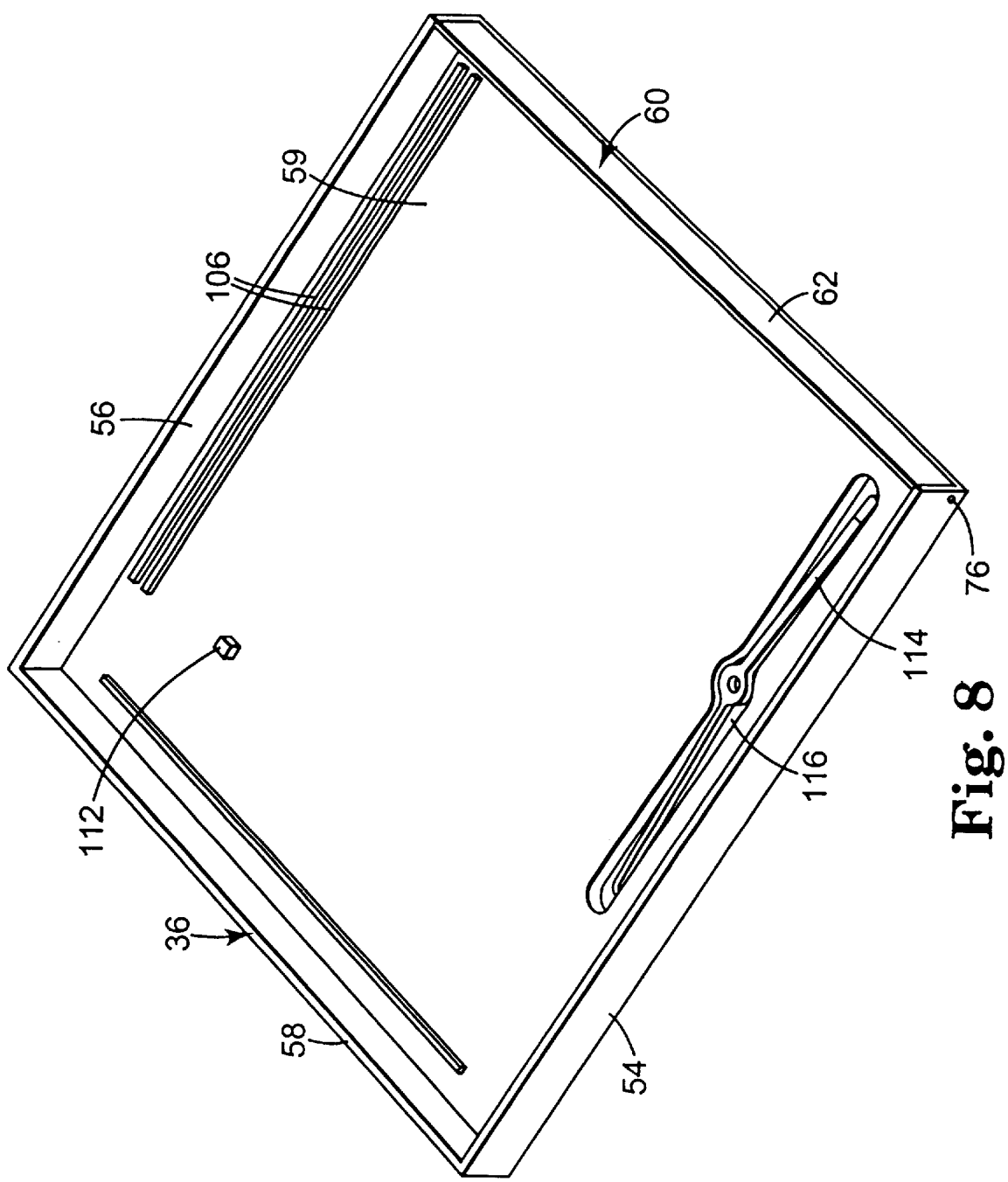
FIGS. 8 and 9 are perspective interior views of opposite sides of an outer housing as shown in FIGS. 5 and 6.
Figure 9:
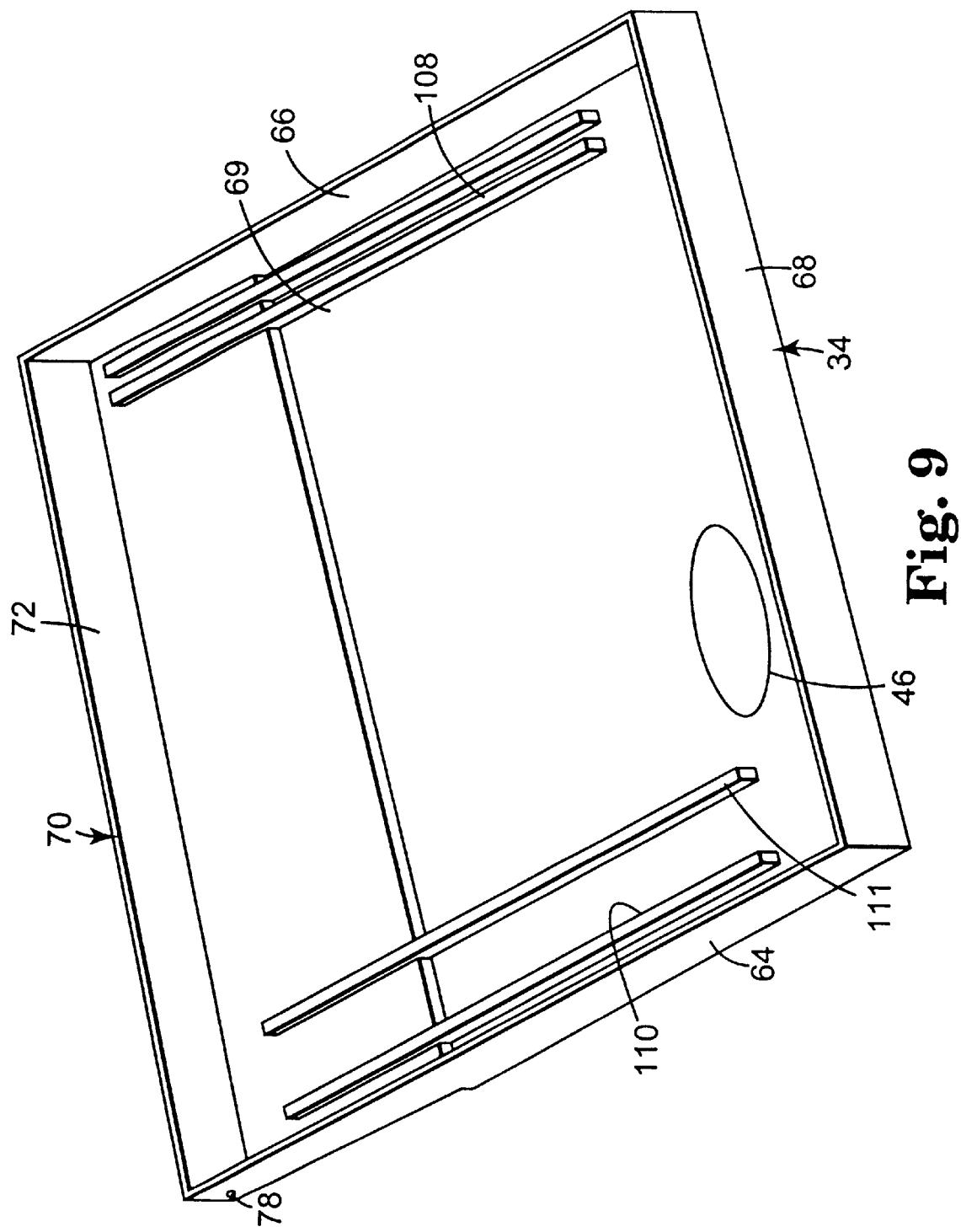
Figure 10:
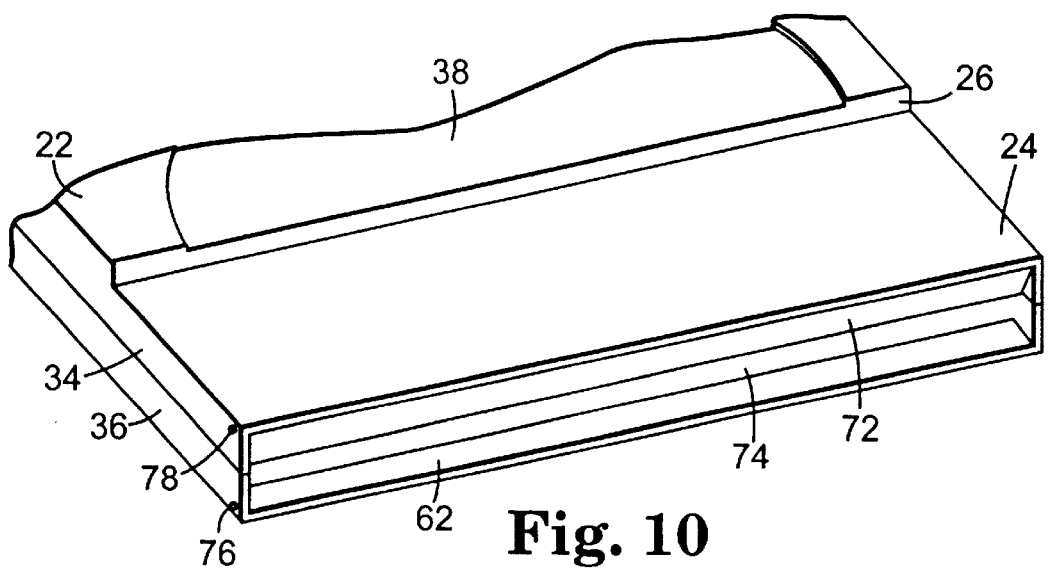
FIG. 10 is a perspective front view of a nose section and door mechanism of an outer housing as shown in FIGS. 5 and 6.
Figure 11:
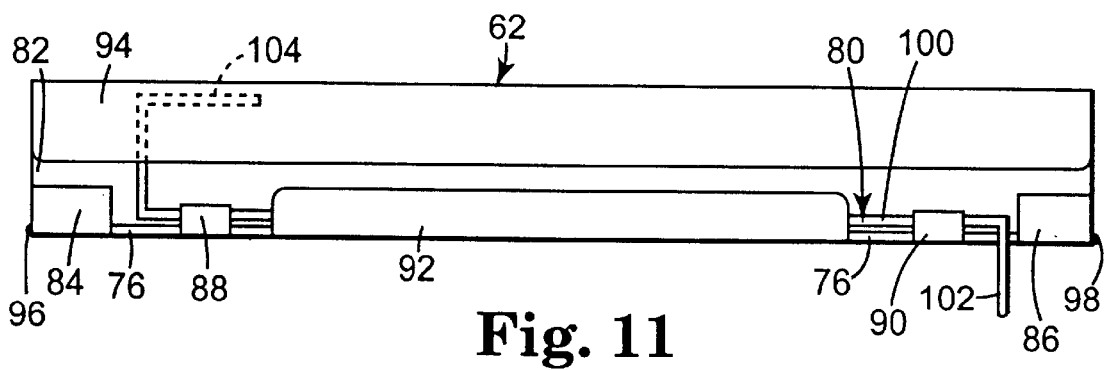
FIG. 11 is a plan view of a door forming part of a door mechanism as shown in FIG. 10.
Figure 12:
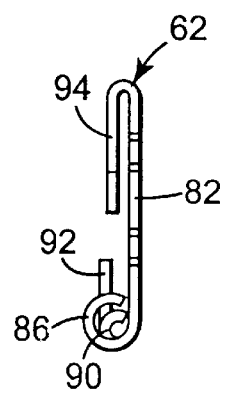
FIG. 12 is an end view of a door as shown in FIG. 11.

FIGS. 8 and 9 are perspective interior views of bottom half 36 and top half 34, respectively, of outer housing 16. FIGS. 10–12 illustrate a door mechanism for use during containment and retraction of inner housing 14 relative to outer housing 16. As shown in FIG. 8, bottom half 36 includes first and second side walls 54, 56, a back wall 58, a bottom wall 59, a front opening 60, and a door 62 mounted proximate to the front opening. Similarly, as shown in FIG. 9, top half 34 includes first and second side walls 64, 66, a back wall 68, a top wall 69, a front opening 70, and a door 72 mounted proximate to the front opening. When top and bottom halves 34, 36 are joined, as shown in FIG. 10, openings 60, 70 together define an access slot 74 through which inner housing 14 is retracted.

Each door 62, 72 is mounted on a respective pin 76, 78, and is rotatable about the pin to swing into outer housing 16 and thereby allow retraction of inner housing 14. However, doors 62, 72 are normally biased in a closed position by a spring mechanism. Specifically, a spring mechanism 80, as illustrated in FIGS. 11 and 12, normally biases doors 62, 72 to extend substantially perpendicular to bottom and top walls 59, 69. Doors 62, 72 could be provided with a locking mechanism that locks the doors in a closed position absent access by the drive. Doors 62, 72 can be sized to contact or overlap with one another in the normally biased position, thereby substantially closing access slot 74 and preventing the introduction of debris into inner housing 14. In this manner, doors 62, 72 meet at approximately a mid point of access slot 74 and operate as "saloon" doors. A single door could be incorporated instead of doors 62, 72. The use of a single door would require greater internal swing clearance, however, possibly increasing the length of outer housing 16. Thus, for economic usage of space, a pair of doors 62, 72 ordinarily will be desirable.

To allow retraction of inner housing 14, doors 62, 72 are manipulable in response to an opening force applied by a lever or other component associated with a disk drive. Doors 62, 72 preferably are fully rotatable to positions substantially parallel to and in contact with bottom and top walls 59, 69, respectively. In other words, in the open position, doors 62, 72 should lie flat against bottom and top walls 59, 69 to allow clearance for retraction of inner housing 14. Because doors 62, 72 swing inward, the width of each door and the length of top and bottom halves 34, 36 along the retraction path should be selected to allow sufficient clearance between inner housing 14 and the maximum inward extent of the doors when the doors lie flat in the open position. Also, the overall height of slot 74 should be sufficient to allow clearance between inner housing 14 and doors 62, 72 during retraction. To provide sufficient clearance, portions of bottom and top walls 59, 69 adjacent slot 74 can be thinned or provided with a tapering or chamfered profile during the molding process. In particular, recesses can be molded adjacent slot 74 with a shape and size appropriate to receive doors 62, 72 when they are pushed inward into the reclining, open position. A thinned profile also may serve to relax certain tolerances adjacent slot 74.

Each door 62, 72 can be configured to include a spring mechanism 80 as shown in FIGS. 11 and 12. FIG. 11 is a plan view of door 62. FIG. 12 is an end view of door 62. Door 62 can be formed from a sheet of metal that is stamped and bent to include a major door surface 82, end flanges 84, 86, intermediate flanges 88, 90, bottom flange 92, and top flange 94. End flanges 84, 86 retain first and second ends 96, 98 of mounting pin 76 adjacent mounting holes formed in side walls 54, 56. Intermediate flanges 88, 90 retain portions of spring mechanism 80. Bottom flange 92 retains a straight portion 100 of spring mechanism 80.

Spring mechanism 80 includes a first tail portion 102 that extends at a right angle relative to straight portion 100 and is positioned to bear against bottom wall 59. Top flange 94 retains a second tail portion 104 of spring mechanism 80. In addition to retaining portions of spring mechanism 80, flanges 92, 94 enhance the stiffness of door 62. Second tail portion 104 extends at a right angle relative to straight portion 100 and in a direction perpendicular to the plane of bottom wall 59. Second tail portion 104 is oriented to bear against major door surface 82. Torsion in spring mechanism 80 causes second tail portion 104 to bias major door surface 82 away from first tail portion 102, thereby maintaining door 62 in an upright, closed position. In response to force exerted by a disk drive, door 62 can be opened against the bias of tail portions 102 and 104 and pushed into a reclining position to allow retraction of inner housing 14.

With further reference to FIGS. 8 and 9, the interior of each half 34, 36 of outer housing 16 includes guide structures that guide inner housing 14 along a substantially linear path upon insertion or retraction relative to outer housing 16. As shown in FIG. 8, for example, bottom wall 59 may include a set of linear guide rails 106 that are formed adjacent side wall 56 and extend over a substantial length of the bottom wall in a direction of retraction. Guide rails 106 can be configured to either receive or engage a reciprocally formed structure or structures on a bottom surface of inner housing 14 in a slidable manner. Alternatively, guide rails 106 may simply serve as a guide for lateral edges of inner housing 14. In either case, guide rails 106 can be integrally molded with outer housing 16.

Similarly, as shown in FIG. 9, three sets of linear guide rails 108, 110, 111 can be formed adjacent side walls 64, 66 to receive or engage corresponding guide structures on a top surface of inner housing 14. Guide rails 108, 110 may serve to guide lateral edges of inner housing 14. With reference to both FIG. 9 and FIG. 7, guide rail 111 can be oriented to engage a reciprocally formed groove 113 in inner housing 14. Like guide rails 106, guide rails 108, 110, 111 can be integrally molded with outer housing 16. As an alternative, guide rails 106, 108, 110, 111 can be insert molded, coated, adhesively mounted, snap-fitted or otherwise attached to outer housing 16 using a different material. For example, whereas inner and outer housings 14, 16 could be formed from a common material, such as polycarbonate, guide rails 106, 108, 110 could be formed from a different material, such as acetyl. In this manner, guide rails 106, 108, 110 could be formed to minimize generation of debris as inner housing 14 slides within or over the rails.

As further shown in FIG. 8, bottom wall 59 may include a stop structure 112 positioned to engage shutter 18, as will be explained, and prevent the shutter from opening when inner housing 14 is contained within outer housing 16. Also, bottom wall 59 may include a locking beam 114 and locking groove 116. Locking beam 114 is configured to engage corresponding structure in the bottom surface of inner housing 14 to thereby prevent retraction. Like guide rails 106, 108, 110, locking beam 114 can be formed from a different material than inner and outer housings 14, 16, thereby minimizing debris generation. Operation of stop structure 112 and locking beam 114 will be further explained with reference to FIGS. 14–22.

Figure 13:
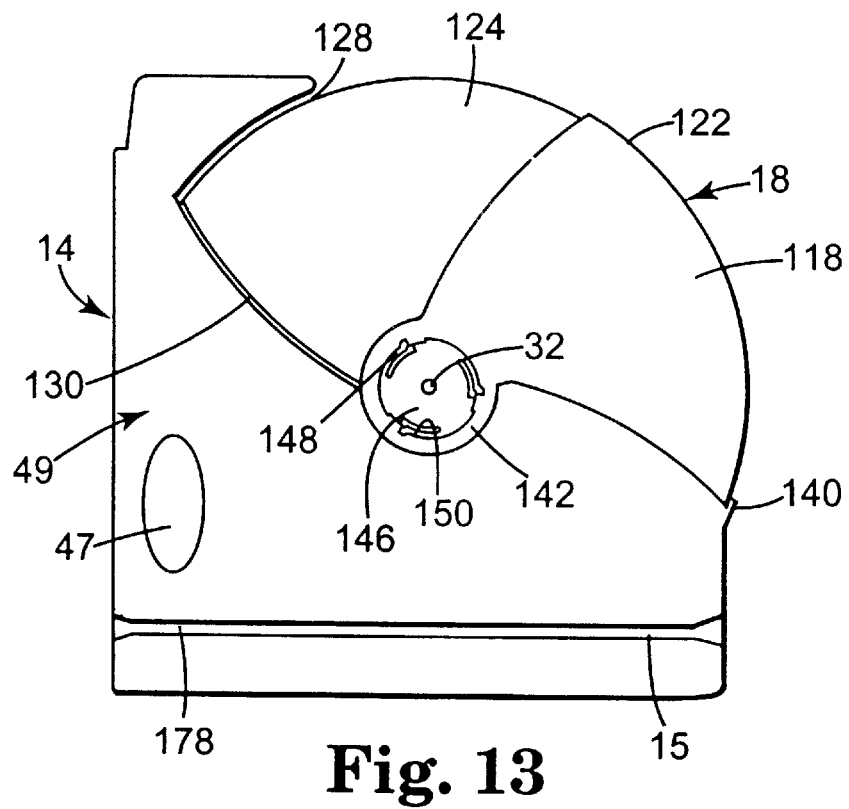
FIG. 13 is a plan view of a first side of an inner housing as shown in FIG. 7.
Figure 14:
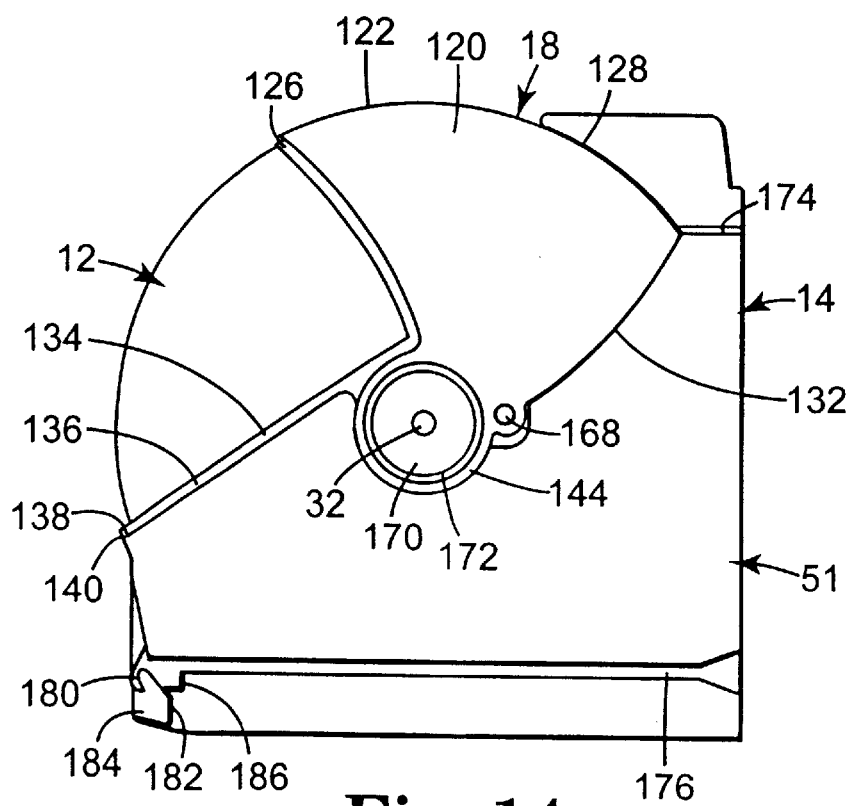
FIG. 14 is a plan view of a second side of an inner housing as shown in FIG. 7.

FIG. 13 is a plan view of top half 49 of inner housing 14. FIG. 14 is a plan view of bottom half 51 of inner housing 14. As shown in FIG. 13, shutter 18 is formed in a rotary configuration to rotate about a central mounting point 32. As an alternative, shutter 18 could be formed to move linearly in a reciprocating manner to cover and uncover disk 12. In the example illustrated by FIGS. 13 and 14, shutter 18 includes first and second sides 118, 120 and a circumferential portion 122 that joins the sides at the outer diameter of disk 12. Shutter sides 118, 120 extend radially outward from central mounting point 32 to circumferential portion 122 and are mounted to glide over an exterior surface of first housing 14 during rotation. In particular, shutter sides 118, 120 and portion 122 are mounted to glide over recessed portions 124, 126, respectively, of inner housing 14.

Mounting of shutter 18 over the exterior of inner housing 14 enhances the "pinch" strength of the inner housing in response to compressive force. Specifically, shutter 18 overlaps portions of inner housing 14 in the closed position and entirely overlaps recessed portion 124 in the open position. The overlapping surfaces of inner housing 14 enhance the effectiveness of shutter 18 in keeping out debris, but also provide support against compressive loads. In addition, the clearances between the externally mounted shutter sides 118, 120 and disk 12 are greater, providing increased room for deflection in response to compressive loads. In other words, shutter sides 118, 120 can deflect a greater distance without contacting disk 12 and transferring a load that could damage the disk. Exterior mounting of shutter 18 also facilitates assembly of inner housing 14. In particular, shutter 18 can be mounted after top and bottom halves 49, 51 are coupled together. Shutter 18 can be formed from a different material than the remainder of inner housing 14 and in particular, the area of the inner housing adjacent to the shutter, to minimize generation of debris. Specifically, fabrication of shutter 18 and inner housing 14 from different materials can reduce the generation of debris due to abrasion during movement of the shutter over the exterior surface of the inner housing. For example, shutter 18 could be formed from an acetyl material, in contrast to the remainder of inner housing 14, which could be formed from polycarbonate. Also, it may be desirable to fabricate inner and outer housings 14, 16 from anti-static materials or materials that otherwise facilitate static control within cartridge 10.

As further shown in FIGS. 13 and 14, a circumferential slot 128 is formed in inner housing 14 adjacent recessed portions 124, 126 to receive circumferential portion 122 of shutter 18 during movement. Slot 128 terminates at raised stop walls 130, 132 that are positioned to limit the movement of shutter 18 during opening. As shown in FIG. 14, another recessed area 134 provides overlapping support to shutter 18 in the closed position, and a raised stop wall 136 limits the movement of shutter 18 during closure. A second circumferential slot 138 allows shutter 18 to overlap to a very limited extent with recessed area 134. For example, this overlap may be on the order of approximately 1 to 3 mm. Again, in addition to providing structural support, the overlapping configuration of shutter 18 and recessed area 134 enhances the effectiveness of the shutter in protecting disk 12 from debris. To that end, inner housing 14 also includes an end flange 140 that extends over a portion of circumferential portion 122 adjacent stop wall 136 and slot 138. End flange 140 helps prevent the entry of debris into slot 138 at the position of abutment between circumferential portion 122 and stop wall 136. Also, end flange 140 could be fortified with a locking mechanism, if desired, to prevent inadvertent movement of shutter 18.

With further reference to FIGS. 13 and 14, shutter sides 118, 120 include mounting rings 142, 144, respectively. Mounting ring 142 is mounted about a spring lock 146. Spring lock 146 includes spring arms 148 that engage indentations 150 in mounting ring 142. Spring arms 148 and indentations 150 are compression fit with one another such that mounting ring 142 and spring lock 146 are mounted in a ratcheted manner. As will be explained, spring lock 146 cooperates with other structure on top half 49 to provide a bias mechanism that biases shutter 18 toward a closed position. The ratcheted mounting of spring lock 146 with mounting ring 142 allows the bias force to be preset on a selective basis.

Figure 15:
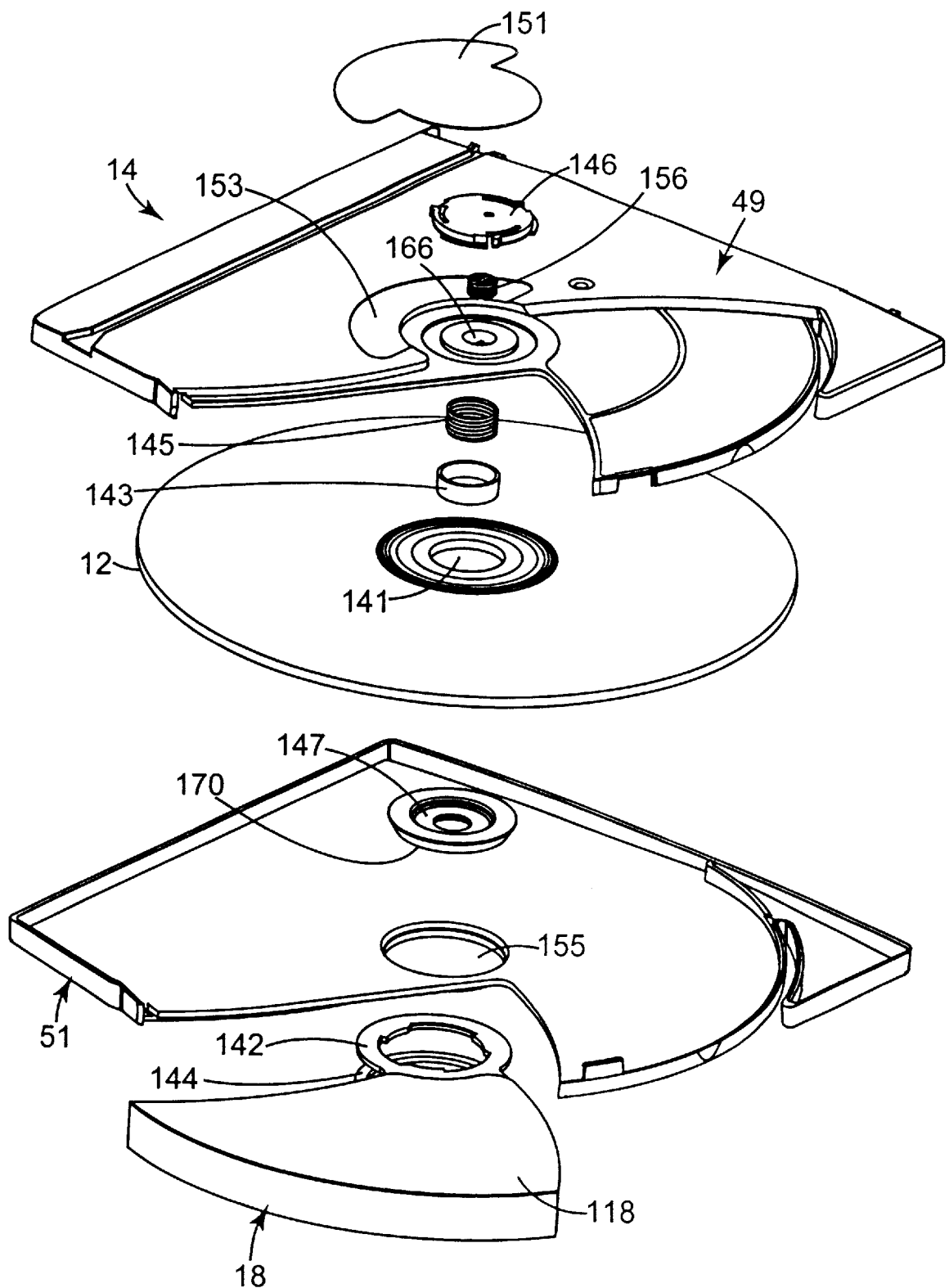
FIG. 15 is an exploded view illustrating one embodiment of an inner housing as shown in FIGS. 13 and 14.

FIG. 15 is an exploded view of inner housing 14 illustrating spring lock 146 and a number of other features. In particular, FIG. 15 shows top half 49, bottom half 51, disk 12, shutter 18, a central opening 141 formed in disk 12, a hub 170 for attachment to one side of disk 12 at the central opening, a cup 143 and a spring 145 mountable within the central opening to provide a disk retention mechanism, a recess 147 in the hub to receive the cup 143 and spring 145, spring lock 146, a recess 166 in top half 49, a spring 156 mountable within the recess 166 for operation with the spring lock 146, and a flange member 151 for attachment to top half 49 within a recess 153 to retain the shutter.

Figure 16:
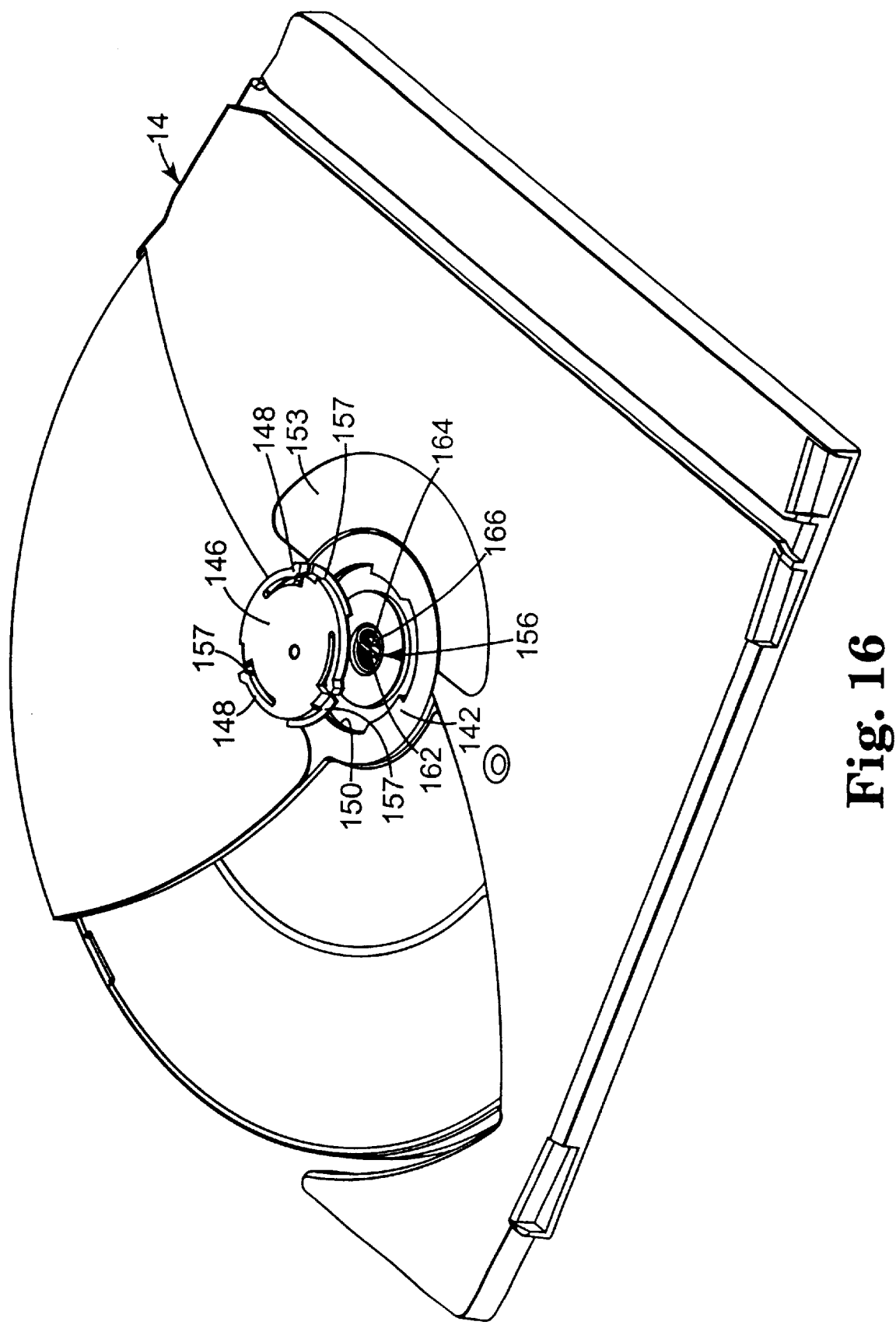
FIG. 16 is a view of a first side of an inner housing as shown in FIG. 13 illustrating a shutter bias mechanism.
Figure 17:
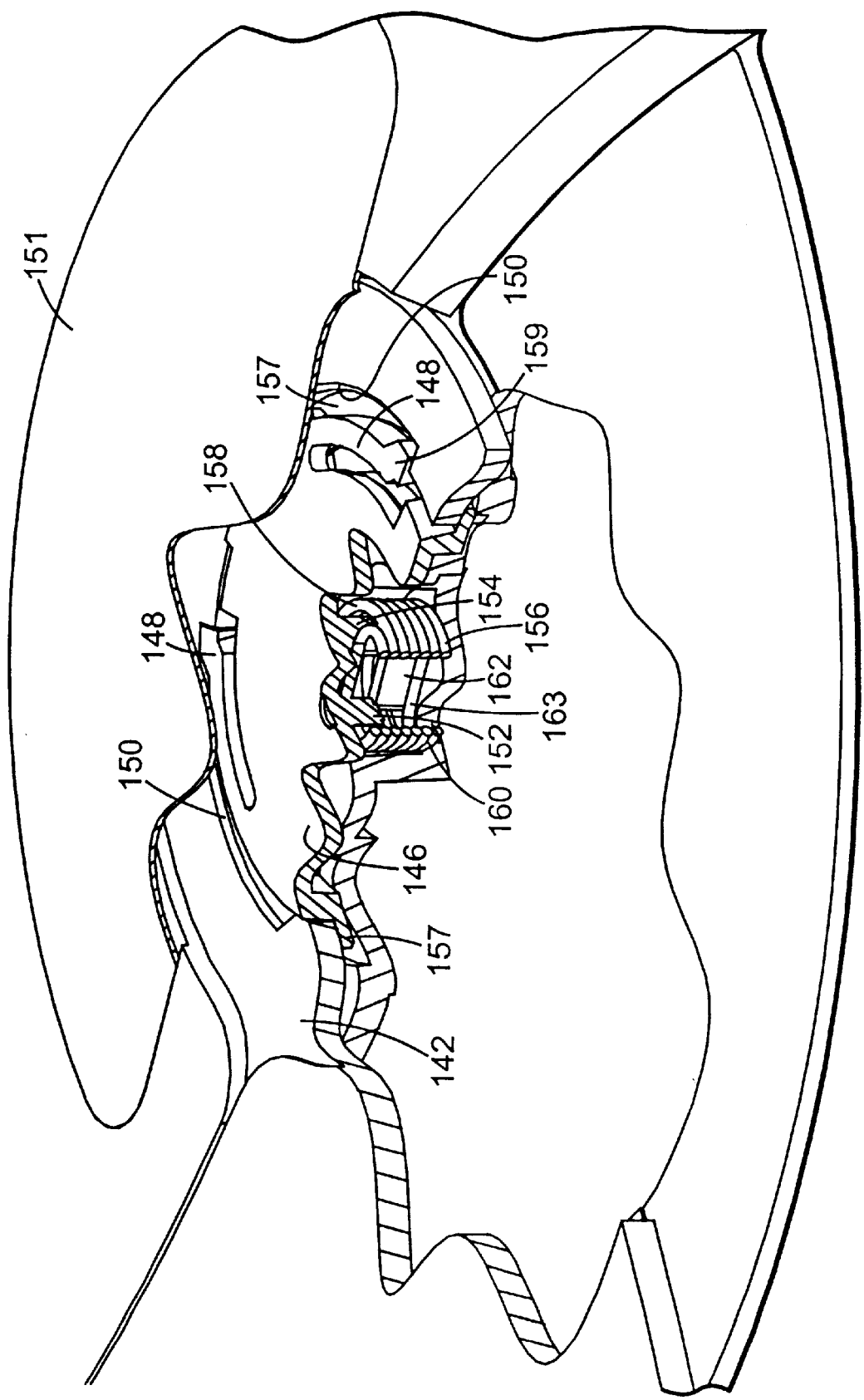
FIG. 17 is a fragmented partial view of a first side of an inner housing as shown in FIG. 16.
Figure 18A:
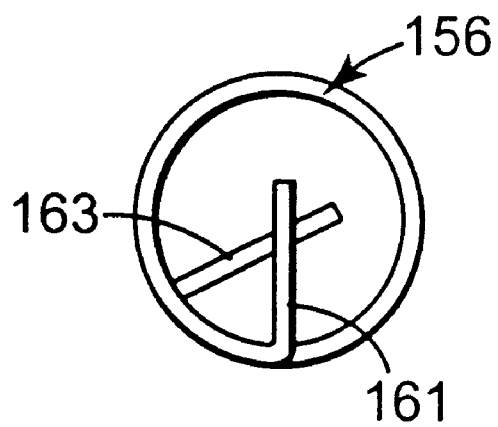
FIG. 18a is a top view of a spring forming part of the shutter bias mechanism of FIG. 16.
Figure 18B:
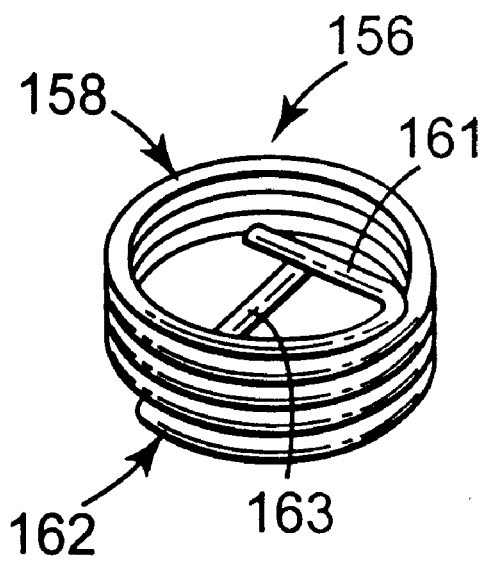
FIG. 18b is a perspective view of a spring forming part of the shutter bias mechanism of FIG. 16.

FIGS. 16 and 17 illustrate the shutter bias mechanism in greater detail. As shown in FIG. 16, spring lock 146 is sized and shaped to fit within shutter mounting ring 142. With reference to FIG. 17, spring lock 146 includes a pair of mounting posts 152, 154. Posts 152, 154 engage one end 158 of spring 156. The other end 160 of spring 156 is mounted on two additional posts 162, 164 formed in cylindrical recess 166. FIGS. 18a and 18b further illustrate spring 156. As shown in FIGS. 18a and 18b, each end 158, 160 of spring 156 includes a spring tail 161, 163, respectively. Spring tail 161 extends inward to bear against posts 152, 154, whereas spring tail 163 extends inward to bear against posts 162, 164. Posts 162, 164 and recess 166 can be integrally molded with top half 49 of inner housing 14.

Upon installation of spring lock 146, spring 156 serves to bias shutter 18 toward a closed position. Specifically, spring 156 bears against posts 162, 164 and posts 152, 154, providing a bias force that prevents rotation of spring lock 146 and, consequently, mounting ring 142 and shutter 18. As shown in FIG. 14, however, shutter side 120 includes an access hole 168 that is engaged by a pin and lever mechanism (not shown) in disk drive 20 to rotate shutter 18 against the spring bias exerted by spring lock 146 and thereby open the shutter for access to disk 12. Thus, spring 156 provides a locking mechanism that prevents shutter 18 from opening under ordinary circumstances, except when inner housing 14 is removed from outer housing 16 and inserted into drive 20.

The structure of spring lock 146 allows spring 156 to be preloaded during manufacture. The mounting posts 152, 154 of spring lock 146 engage spring 156 upon placement within mounting ring 142. However, spring lock 146 is then rotated to lock it into place within shutter mounting ring 142. Specifically, thinned flange sections 157 are rotated under reciprocally formed sections in mounting ring 142. At the same time, spring arms 148 are biased inward, providing a compression, locking fit. The rotation of spring lock 146 exerts a rotational force against spring 156, which is mounted in a fixed manner about posts 162, 164. This rotational force, in turn, preloads spring 156 against posts 162, 164 during installation of spring lock 146 such that shutter 18 is thereafter biased toward the closed position. To select a desired spring bias, spring lock 146 is rotated such that each of spring arms 148 selectively engages one of indentations 150 in a ratchet mode.

In the example of FIG. 17, spring lock 146 is rotated counter-clockwise between indentations 150 to incrementally increase the load applied against spring 156 by posts 152, 154. Once a spring arm 148 is rotated into engagement with a respective indentation 150, a stop extension 159 on the trailing edge of the spring arm bears against a stop surface 161 of the indentation to prevent spring lock 146 from rotating backward with the spring force generated by spring 156. In this manner, spring arms 148 of spring lock 146 are ratcheted between different indentations 150 in mounting ring 142 to set the spring bias. At the same time, spring 156 bears against posts 162, 164 and exerts a rotational spring force against posts 152, 154, which is transferred to mounting ring 142 via spring lock 146 to bias shutter 18 in a closed position. Any debris generated by spring 156 is generally confined to recess 166, and contained within the recess by spring lock 146, thereby protecting disk 12 and the drive components from debris that otherwise could escape and cause performance problems.

Mounting ring 144, as shown in FIG. 14, is mounted about hub 170, and is free to rotate about the hub. A raised circular wall 172 physically separates mounting ring 144 from hub 170, however, thereby decoupling shutter 18 from rotation of disk 12. Wall 172 can be integrally molded with inner housing 14. Mounting of shutter 18 over the exterior of the remainder of inner housing 14, in contrast to inside the housing, facilitates mounting of ring 144. Hub 170 is mounted in a fixed manner over central aperture 141 of disk 12, and thereby supports the disk for rotation. Specifically, hub 170 can be sized greater than aperture 141 and adhesively affixed to the inner diameter of disk 12. As an alternative, hub 170 can be milled to snap fit into a reciprocally formed ring around central aperture 141. As a further alternative, hub 170 could be sized for mounting within central aperture 141. Also, hub 170 is made at least partly from metal and, preferably, stainless steel. Hub 170 is accessible through a central aperture 155 in bottom half 51 of inner housing 14 for access by a disk drive.

For high areal density requirements and correspondingly aggressive optical tolerance, stainless steel provides a rigid material that is less susceptible to thermal expansion and contraction for contemplated operating temperatures. A magnetic clutch (not shown) within a disk drive magnetically engages hub 170 and, with an associated spindle motor, thereby spins disk 12 for read and write operations. The magnetic clutch can be realized by a permanent magnet bonded to the top of the spindle motor, along with a precision surface on the spindle that forms part of the magnetic loop. Stainless steel provides a magnetic material for engagement by the clutch and spindle motor. In addition, stainless steel is resistant to corrosion and wear. Hub 170 can be insert-molded into a plastic ring, if desired. In this case, hub 170 provides magnetic clutching, whereas the plastic ring can be configured for physical registration and alignment with the drive clutch. As an alternative, the drive could employ a mechanical chuck for rotation of disk 12. In this case, the incorporation of a magnetic hub would not be necessary. In any event, containment of inner housing 14 within outer housing 16 serves to protect hub 170 from debris. In this manner, cartridge 10 reduces the possibility of disk tilt, air gap variation, or clutch slippage due to debris, as well as potential centrifugal flow of such debris onto disk 12 or the drive components.

If disk 12 is configured for air-incident access, the portion of hub 170 that is accessible through inner housing 14 can reside on the substrate side of the disk. In this case, hub 170 is accessible from the bottom of inner housing 14, and the recording layer of disk 12 is accessible from the top of the inner housing following the opening of shutter 18. If disk 12 is configured for substrate-incident access, hub 170 remains accessible from the bottom of inner housing 14, but is on a side of the disk opposite the substrate. In this case, the recording layer of disk 12 is also accessible from the bottom of inner housing 14. In some embodiments, the recording layer could be formed on a side of disk 12 adjacent the bottom of inner housing 14 whether air-incident or substrate-incident access is employed. For dual-sided applications, hub 170 may be on either side of disk 12 and inner housing 14.

When disk 12 is not in use, it can be subjected to abrupt movements or vibrations that cause it to move within inner housing 14. In particular, the disk can move in both an axial and radial direction. If disk 12 strikes inner housing 14 with sufficient force, damage can result, including data loss in extreme cases. Also, movements of disk 12 within inner housing 14 can produce a rattling sound that affects user perception of the structural integrity and quality of cartridge 10. Therefore, it may be desirable to incorporate a mechanism that generally restrains disk 12 against axial and radial movement during periods of nonuse. The restraining mechanism may include, for example, a spring mechanism as shown in FIG. 15 that causes disk 12 to bear against interior surfaces of inner housing 14 when not in use, thereby preventing disk movement.

Such a restraining mechanism can be mounted adjacent hub 170, and can be configured for disengagement when disk 12 is loaded into drive 20. For example, with reference to FIG. 15, the spring mechanism can be mounted within the central aperture 141 defined by disk 12 and compressed upon installation of disk 12 within inner housing 14 to exert a bias against one of inner housing halves 49, 51 and hub 170. In the example of FIG. 15, the spring mechanism includes a cup 143 that mounts into recess 147 of hub 170, and a spring 145 that mounts into the cup and the hub recess. Spring 145 is sized to compress upon attachment of first and second halves 49, 51 and resulting closure of inner housing 14. The compressed spring 145 generates a spring force against hub 170 and against first and second halves 49, 51 to stabilize disk 12 against shock loads. In the event that debris is generated by spring 145, such debris is generally confined to cup 143 within recess 147, particularly if the cup is biased to substantially seal against the interior surface of top half 49 of inner housing 14. An example of a suitable restraining mechanism is disclosed, for example, in U.S. patent application Ser. No. 08/979,821, filed Nov. 26, 1997, and entitled "DATA STORAGE CARTRIDGE HAVING A RESTRAINING MECHANISM," the entire content of which is incorporated herein by reference.

To avoid exposure to debris, it is desirable that only hub 170 be generally accessible from outside of inner housing 14. In other words, the portions of disk 12 immediately adjacent the outer diameter of hub 170 are not generally accessible from the exterior of inner housing 14. Although a small gap may exist between the periphery of hub 170 and the inner diameter of the aperture 155 in inner housing 14 through which the hub is accessible, the gap should be sufficiently small to limit the introduction of debris into the interior of the inner housing. Thus, in addition to restraining disk 12, the spring mechanism described above can be effective in biasing hub 170 against the wall adjacent the central aperture 155 defined by inner housing 14, thereby providing sealing pressure that prevents introduction of debris into the inner housing. In other words, the hub 170 fills the aperture in inner housing 14 and presses tightly against the inner wall of the inner housing when not in use. When disk 12 is accessed by a drive, a magnetic clutch magnetically engages hub 170. A portion of the spindle motor also protrudes through an aperture in the hub 170 and contacts cup 143, exerting a bias against the spring force sufficient to release the hub from engagement with the inner wall and allow rotation of the disk.

Figure 19:
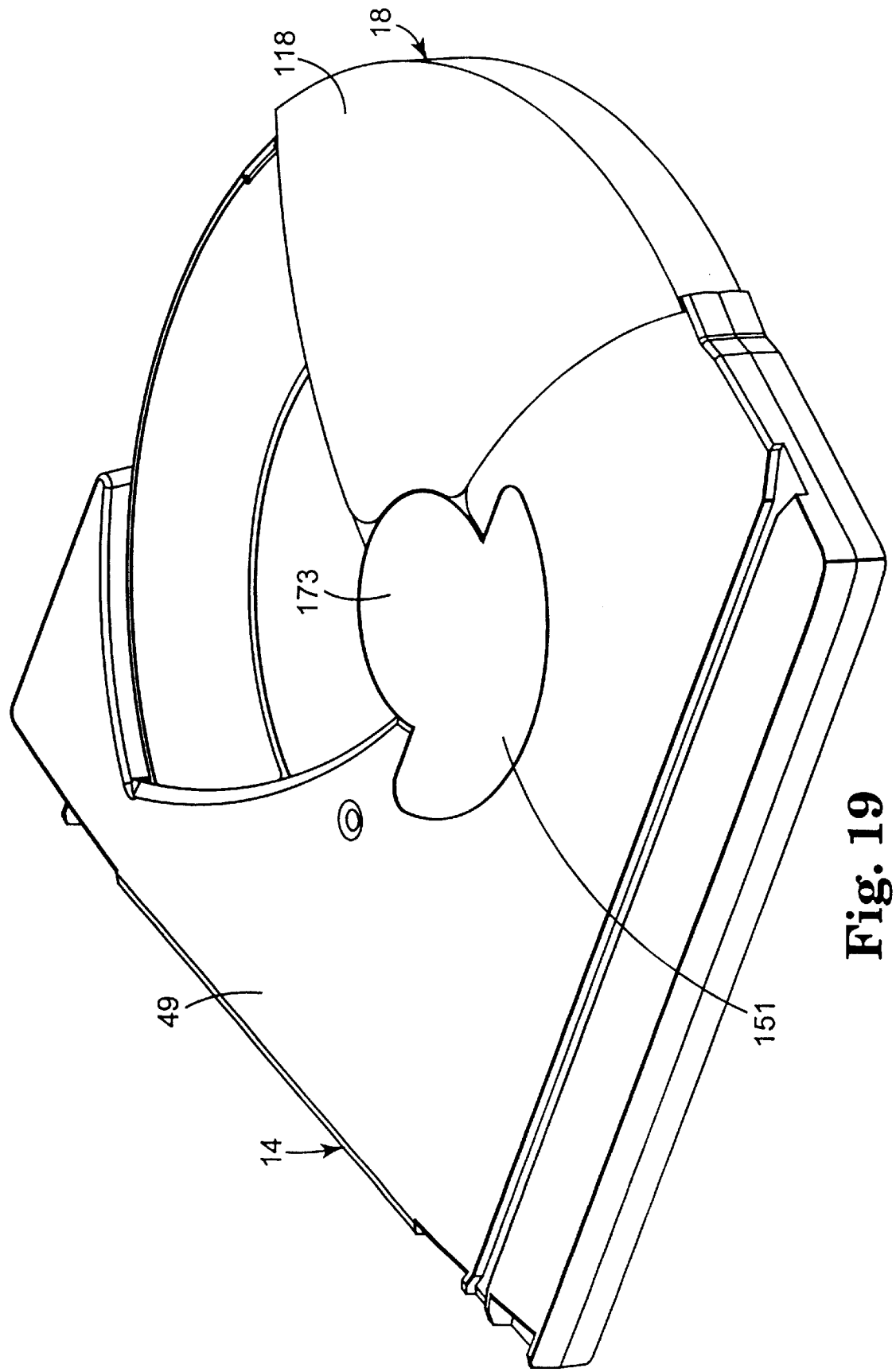
FIG. 19 is a view of the first side of the inner housing of FIG. 13 illustrating a shutter retention mechanism.

FIG. 19 further illustrates a shutter retention mechanism. Upon installation, shutter sides 118, 120 may have a tendency to bow outward. Consequently, under severe shock loads, e.g., by droppage, it is possible that mounting rings 142, 144 can break free of engagement with spring lock 146 and ring 172. As shown in FIGS. 15 and 19, a flange member 151 can be mounted on top half 49 of inner housing 14. For example, flange member 151 can be adhesively bonded within recess 153. As one alternative, flange member 151 could be integrally molded with top half 49. Flange member 151 includes a surface 173 that extends over shutter ring 142 and spring lock 146. The overlapping surface of flange member 151 preferably is spaced apart from shutter ring 142 for ease of rotation of shutter 18. To limit movement of shutter ring 142 outward from inner housing 14, however, flange member 151 is spaced very closely to the surface of the shutter ring. In this manner, flange member 151 is capable of generally preventing separation of mounting ring 142 from inner housing 14, enhancing structural integrity. As an alternative, a structure similar to flange member 151 could be mounted on bottom half 51 and oriented to overlap a portion of shutter ring 144 and/or shutter side 120, provided that the flange member does not interfere with access to hub 170.

As further shown in FIG. 14, a groove 174 is formed in inner housing 14 to receive stop structure 112 (shown in FIG. 8). Stop structure 112 glides through groove 174 during insertion of inner housing 14 into outer housing 16. At full depth of insertion, structure 112 abuts against shutter side 120, preventing shutter 18 from moving during containment of inner housing 14 within outer housing 16. Specifically, structure 112 maintains shutter 18 in the closed position to avoid exposing disk 12 to the interior of outer housing 16.

Stop structure 112 combines with bias spring 156 to keep shutter 18 in the closed position, but is released upon retraction of inner housing 14 from outer housing 16. Also, access hole 168 is manipulable by drive 20 to overcome the spring bias and move shutter 18 into the open position. Thus, in one embodiment, under ordinary circumstances, disk 12 is never exposed outside of disk drive 20. In particular, disk 12 is never touched by human hands. Rather, transfer of disk 12 for access by drive 20 is accomplished automatically by retraction of inner housing 14 through the docking channel defined by nose section 24. Thus, cartridge 10 provides a hierarchy of barriers against debris.

As further shown in FIGS. 13 and 14, inner housing 14 may include grooves 176, 178. Groove 176 is formed in bottom half 51 of inner housing 14 for communication with locking beam 114. Groove 178 is optionally formed in top half 49 of inner housing 14 and can be used in conjunction with guide structures in disk drive 20 and/or outer housing 16 to guide the inner housing along a linear path.

Figure 20:
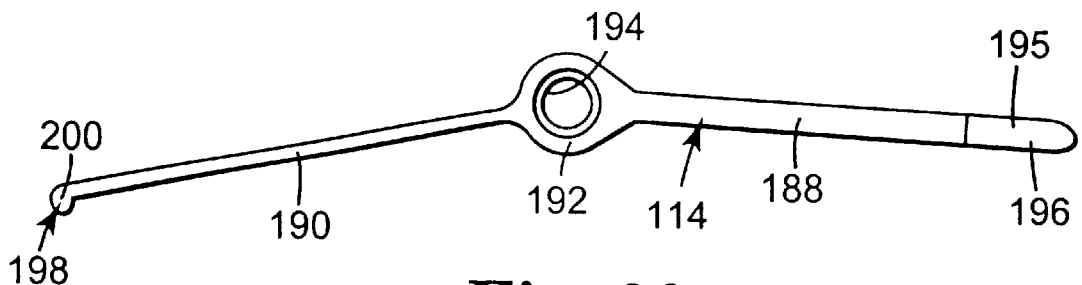
FIG. 20 is a plan view of a locking beam incorporated in a cartridge as shown in FIG. 1.
Figure 21:
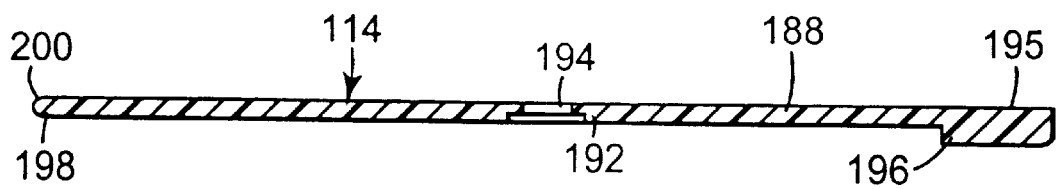
FIG. 21 is a cross-sectional side view of a locking beam as shown in FIG. 20.
Figure 22:
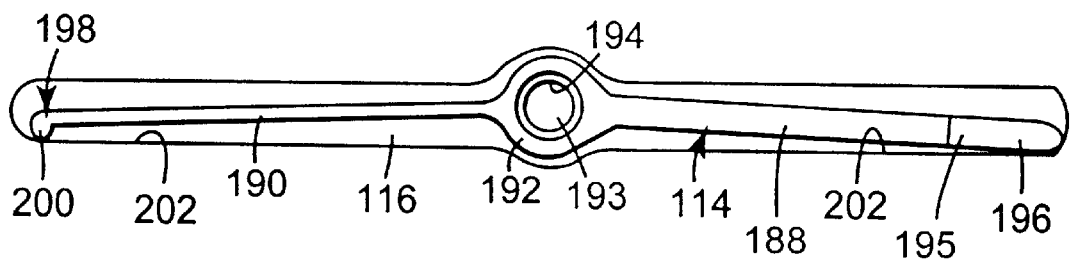
FIG. 22 is a plan view of a locking beam as shown in FIG. 20 as mounted within a locking groove.

The operation of locking beam 114 will now be described with reference to FIGS. 8, 14, and 20–26. As shown in FIG. 14, bottom half 51 of inner housing 14 further includes a hooking structure 180 and a locking indentation 182. Hooking structure 180 is raised relative to a recessed access opening 184 formed in bottom half 51 of inner housing 14. Locking indentation 182 includes a wall 186 that is further raised relative to hooking structure 180. Also, locking indentation 182 is formed adjacent one end of groove 176. With reference to FIGS. 20 and 21, locking beam 114 comprises an elongated beam that is sized to fit within groove 176. FIG. 20 is a plan view of locking beam 114. FIG. 21 is a cross-sectional side view of locking beam 114. FIG. 22 is a plan view of locking beam 114 as mounted within locking groove 116. As shown in FIGS. 20 and 21, locking beam 114 includes a first beam section 188, a second beam section 190, and a mounting collar 192. Mounting collar 192 has an aperture 194 that receives a mounting post 193, as shown in FIGS. 8 and 22, formed in locking groove 116 in bottom half 36 of outer housing 16. First and second beam sections 188, 190 extend from mounting collar 192 at an angle relative to one another.

As illustrated in FIGS. 20 and 21, first beam section 188 includes an end member 195 with a raised surface, or "wedge," 196 that is raised upward relative to the remainder of the first beam section. In particular, wedge 196 is raised upward relative to bottom wall 59 of bottom half 36 of outer housing 16 when locking beam 114 is mounted within locking groove 116. Second beam section also includes an end member 198 with a rounded surface 200. Locking beam 114 preferably is formed from a resiliently flexible material. As shown in FIGS. 8 and 22, locking beam 114 is deformed against its natural shape for mounting in locking groove 116. As a result, end members 195, 198 contact and exert a bias force against outer wall 202 of locking groove 116. In particular, the bias force tends to push end member 195 and wedge 196 toward outer wall 202. In operation, this force allows wedge 196 to lock into locking indentation 182, as will be explained below with reference to FIGS. 23–26.

Figure 23:
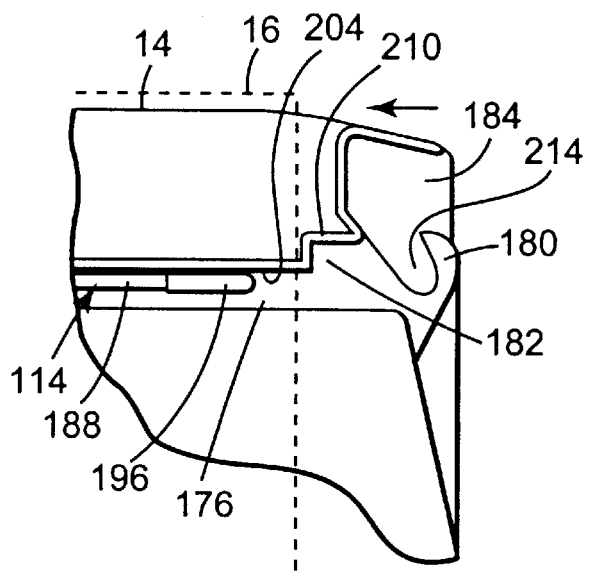
FIGS. 23–26 are partial plan views of an outer housing as shown in FIGS. 5 and 6, illustrating the insertion and removal of an inner housing.
Figure 24:
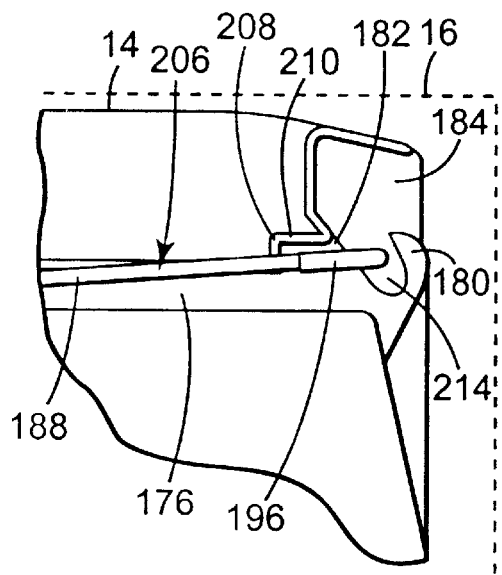

FIG. 23 illustrates insertion of inner housing 14 into outer housing 16, shown in dotted lines. In particular, FIG. 23 shows a portion of bottom half 51 of inner housing 14 that includes hooking structure 180, recessed access area 184, locking indentation 182, groove 176, and locking beam 114. As shown in FIG. 23, during insertion of inner housing 14 into outer housing 16, in a direction indicated by the arrows, locking beam 114 is retained in groove 116. As groove 116 slides across wedge 196 of locking beam 114, the wedge exerts a bias force against outer wall 204 of the groove. As shown in FIG. 24, upon full insertion of inner housing 14 into outer housing 16, wedge 196 clears outer wall 204 at the end of groove 176 adjacent locking indentation 182. The internal bias of locking beam 114 thereby pushes wedge 196 into locking indentation 182.

Wedge 196 is raised relative to the remainder of first beam section 188, and thereby contacts the bottom of groove 176 and locking indentation 182. The remainder of first beam section 188 is sufficiently thin, however, to ride over outer wall 204. This allows wedge 196 to firmly engage locking indentation 182. Specifically, the raised wedge 196 is allowed to engage the recessed area defined by locking indentation 182. The bias of locking beam 114 holds wedge 196 within locking indentation 182. At the same time, the trailing edge 208 of wedge 196 bears against wall 210 of locking indentation 182. In this manner, wedge 196 prevents retraction of inner housing 14 from outer housing 16. In particular, wall 210 bears against wedge 196 to resist any retraction force applied to inner housing 14. Thus, wedge 196 and locking indentation 182 serve to lock inner housing 14 with outer housing 16, thereby protecting the inner housing from debris. Inner housing 14 can only be retracted upon insertion into a disk drive, as will be described with respect to FIGS. 25 and 26.

Figure 25:
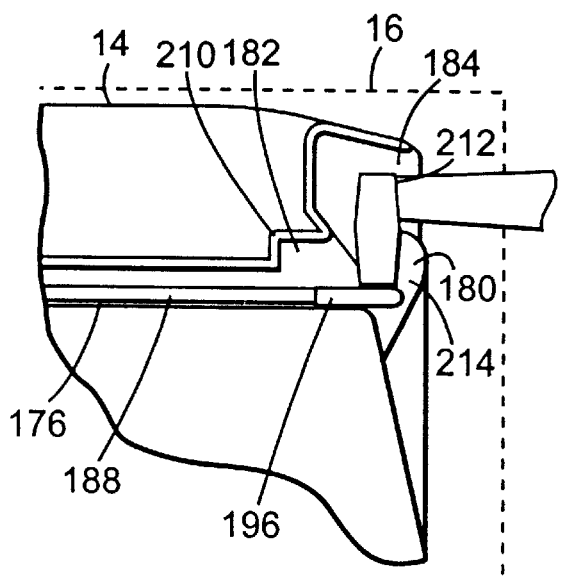
Figure 26:
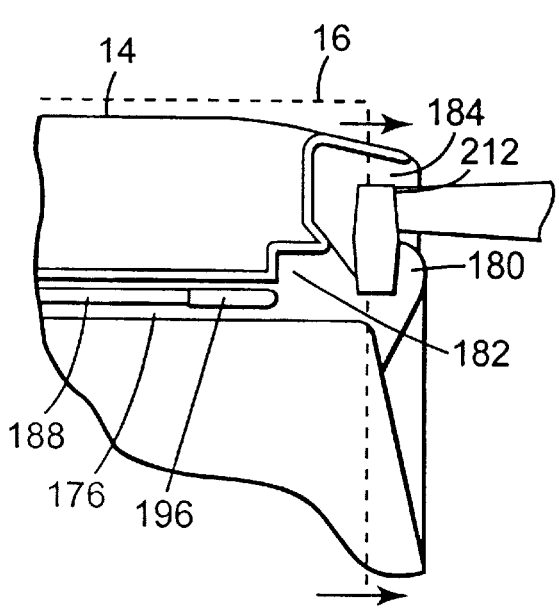

FIGS. 25 and 26 illustrate retraction of inner housing 14 upon insertion in a disk drive. As shown in FIG. 25, for retraction of inner housing 14, a hooking element 212 in the disk drive engages recessed access opening 184 and hooking structure 180. As described with reference to FIGS. 10–12, hooking element 212 pushes open doors 62, 72 at access slot 74 of outer housing 16. Hooking element 212 can be pushed into outer housing 16. Alternatively, hooking element 212 may be generally fixed in position, and engage doors 62, 72 as outer housing 16 is pushed into the disk drive. To push doors 62, 72 fully into the open position, the height of hooking element 212 should be approximately equivalent to the height of access slot 74 minus the thicknesses of the doors. Upon insertion into recessed access opening 184, hooking element 212 moves laterally to engage hooking structure 180. At the same time, hooking element 212 pushes wedge 196 out of locking indentation 182.

Wedge 196 is sized to extend over opening 214 defined by hooking structure 180. As a result, hooking element 212 is able to engage hooking structure 180 and push wedge 196 out of locking indentation 182 in one simultaneous step. In this manner, hooking element 212 unlocks inner housing 14 for retraction from outer housing 16, and engages hooking structure 180 to exert the retraction force. Specifically, as shown in FIG. 26, once wedge 196 has been removed from locking indentation 182, hooking element 212 exerts a pulling force against hooking structure 180 to retract inner housing 14 from outer housing 16.

Upon removal from locking indentation 182, wedge 196 and the remainder of first beam section 188 return to groove 176. Groove 176 thereby slides over locking beam 114 and provides, in addition to the locking function, a degree of guidance to maintain retraction of inner housing 14 along a substantially linear path. In this manner, groove 176 contributes to the effect of other guide structures in avoiding binding during retraction of inner housing 14. The avoidance of binding is particularly desirable given that all of the retraction force exerted against inner housing 14 need only be applied by a single hooking element 212 at one side of the inner housing, i.e., at the corner near hooking structure 180.

Figure 27:
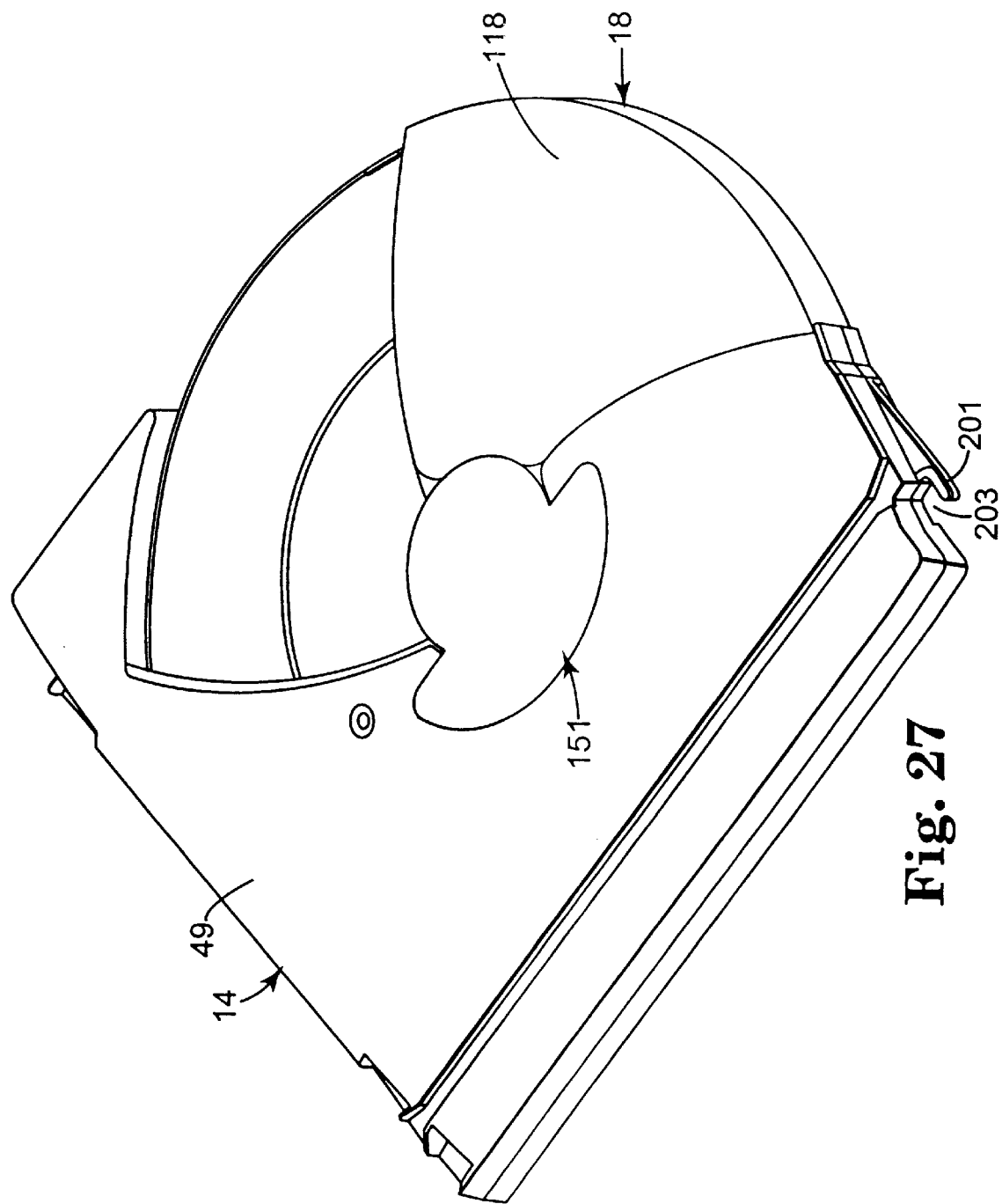
FIG. 27 is a perspective view of an inner housing incorporating an alternative hooking structure.

FIG. 27 is a perspective view of an inner housing incorporating an alternative hooking structure 201. As shown in FIG. 27, hooking structure 201 substantially corresponds to hooking structure 180, but generally provides a wider access area 203 for hooking element 212.

Figure 28:
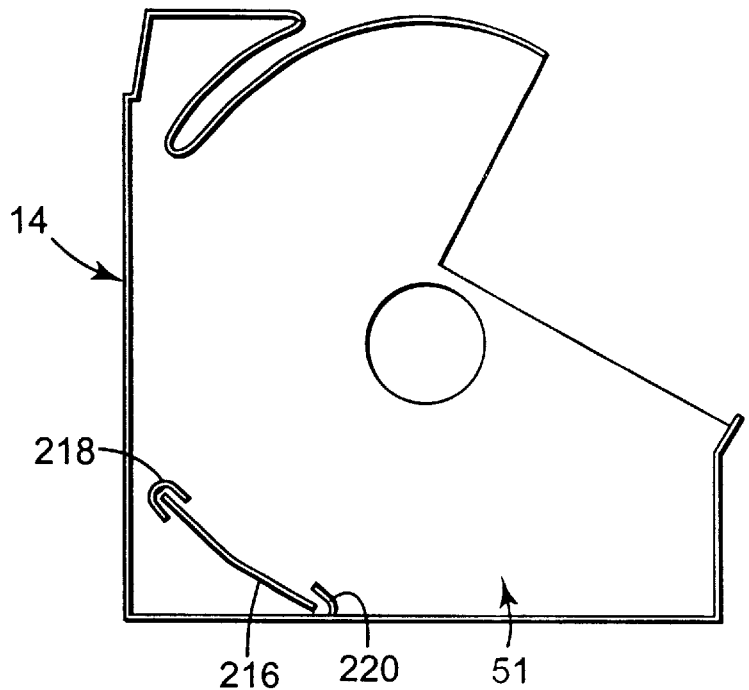
FIG. 28 is a plan view of the interior of an inner housing incorporating a filter element.

FIG. 28 is a plan view of the interior of inner housing 14 incorporating a filter element 216. To further reduce the possibility of optical or mechanical performance degradation due to debris, inner housing 14 may incorporate such a filter element 216 to capture debris. As shown in FIG. 28, one or both halves of inner housing 14 may include interior brackets 218, 220 that retain filter element 216. Half 51 is shown in FIG. 28. Brackets 218 are positioned at a corner of inner housing 14 outside of the rotational path of disk 12 (not shown in FIG. 28). Filter element 216 can be arranged as a sheet element that extends generally tangentially to the outer diameter, or circumference, of disk 12. Filter element 216 can be formed from a variety of well known filter materials effective in trapping microscopic debris that may enter inner housing 14 or the drive. For example, filter element 216 can be formed from a polystyrene electret material. As disk 12 rotates, centrifugal force tends to spin debris outward for capture by filter element 216. Also, the air circulation generated by the rotation of disk 12 generates a pumping effect that draws debris outward from the inner diameter of the disk for capture by filter element 216. Filter element 216 preferably is designed to last the life of cartridge 10 so that it is not necessary to open inner housing 14 for filter replacement.

Figure 29:
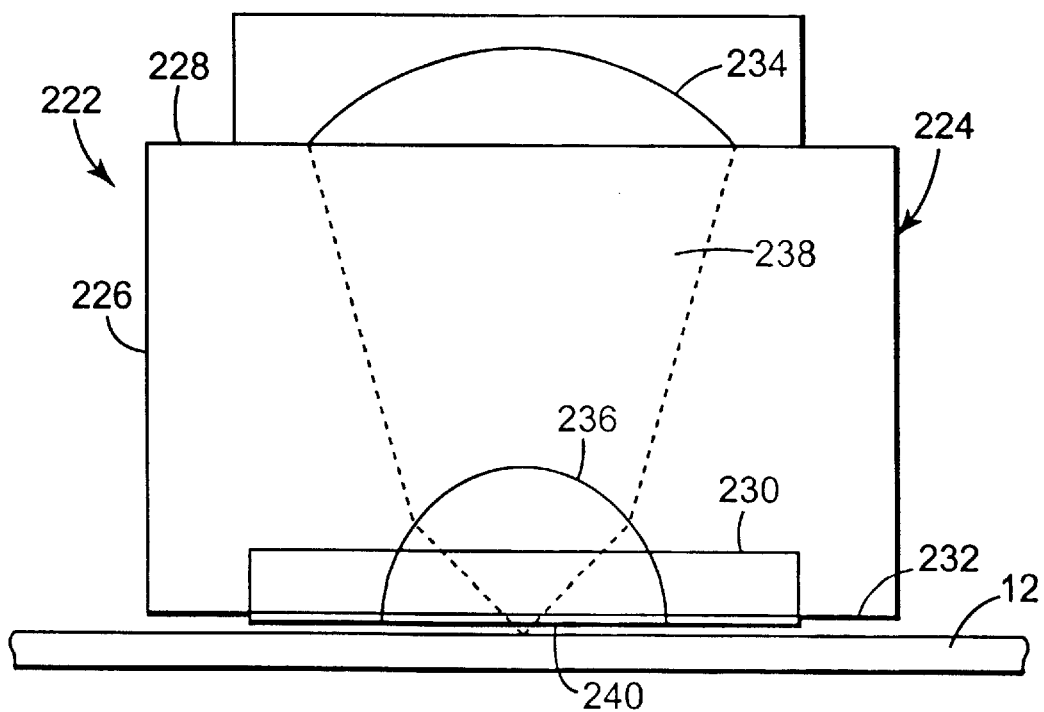
FIG. 29 is a diagram illustrating a near field recording system useful with a cartridge as shown in FIG. 1.

FIG. 29 is a diagram illustrating a near field recording system 222 useful with a cartridge as shown in FIG. 1. System 222 may be integrated with a drive 20, and includes a flying head assembly 224 having optical and magnetic components for recording data on disk 12. An example of a suitable flying head assembly, and an exemplary near field recording system is disclosed in U.S. patent application Ser. No. 08/846,916, filed Apr. 29, 1997, and entitled "ELECTRO-OPTICAL STORAGE SYSTEM WITH FLYING HEAD FOR NEAR-FIELD RECORDING AND METHOD," the entire content of which is incorporated herein by reference.

As shown in FIG. 29, flying head assembly 224 may include a slider element 226 with a top surface 228, a channel surface 230, and an air-bearing surface 232. Air-bearing surface 232 can be designed to ride at a predetermined height above disk 12 while the disk is rotating at a specific speed. Flying head assembly 224 further includes optical components for coupling a beam, e.g., a laser beam, to the surface of disk 12. The optical components include an objective lens 234 and a solid immersion lens (SIL) 236 mounted within slider element 226. The distance separating air-bearing surface 232 from the surface of disk 12 is quite small, and may be less than a wavelength of the beam emitted by head assembly 224 to take advantage of the phenomenon of evanescent coupling.

Objective lens 234 focuses a beam of radiation, such as a laser beam, onto SIL 236. An optical clear path 238 is provided between SIL 236 and objective lens 234 so that radiation can be effectively transmitted from one to the other and back again. Optical clear path 238 may include an optically transparent material, such as air, glass, optically clear plastic, and the like. The focused beam converges near a flat portion 240 of SIL 236. Evanescent waves couple optical energy to a small domain on disk 12. The optical energy heat a portion of a recording layer in disk 12 to a predetermined temperature, creating a recording domain. If the near field recording technique is applied to a phase change medium, the heated domain is simply allowed to cool to either a crystalline or amorphous state indicative of a data condition depending on the temperature or cooling time.

If the near field recording technique is applied to a magneto-optic medium, however, the optical energy heats a portion of a magneto-optical layer of the disk 12 above its Curie temperature to form a magnetizable domain. In this case, flying head assembly may include means for generating a magnetic recording field. In particular, as shown in FIG. 29, a magnetic coil (not shown) can be carried with within slider element 226. The heated domain is allowed to cool in the presence of a magnetic field generated by the magnetic coil. The magnetic field overcomes the demagnetizing field of the perpendicular anisotropy recording medium, causing the localized domain to acquire a particular magnetization. The direction of the magnetic field and the resulting magnetization determine the data represented at the domain.

To read the recorded data, drive 20 may apply a lower intensity read beam to disk 12 via flying head assembly 224. Specifically, objective lens 234 and SIL 236 can be used to transmit a read beam to the surface of disk 12. In magneto-optic applications, for example, upon reflection from disk 12, the read beam experiences a Kerr rotation in polarization. The Kerr angle of rotation varies as a function of the magnetization of the localized domain. An optical detector (not shown) is optically coupled to receive the reflected read beam. For example, the optical detector can be integrated with flying head assembly 224 and oriented to receive the reflected beam. The optical detector and associated electronics operate to translate the Kerr rotation angle into an appropriate bit value. In this manner, drive 20 is able to retrieve the data recorded at each domain on disk 12.

A number of embodiments of the present invention have been described. Nevertheless, it will be understood that various modifications may be made without departing from the spirit and scope of the invention. Accordingly, other embodiments are within the scope of the following claims.

What is claimed is:

1. A data storage disk cartridge for insertion into a data storage disk drive, the cartridge comprising:
    an inner housing configured to receive and contain a disk, the inner housing defining an aperture for access to a disk hub, an access area for access to a recording surface of the disk, and a shutter that is movable to cover and uncover the access area, thereby protecting the recording surface of the disk against debris; and
    an outer housing configured to receive and contain the inner housing, the outer housing including a door mechanism fixedly coupled to the outer housing proximate to a slot in the outer housing, wherein the door mechanism is openable and closeable such that the outer housing encloses the inner housing in its entirety and thereby protects a surface of the inner housing against debris when the door mechanism is closed, and wherein the outer housing allows at least partial removal of the inner housing from the outer housing when the door mechanism is opened during use of the disk within the data storage disk drive.

2. The cartridge of claim 1, further comprising a disk contained within the inner housing.

3. The cartridge of claim 2, wherein the disk is an optical disk.

4. The cartridge of claim 2, wherein the disk comprises a rewritable optical disk.

5. The cartridge of claim 2, wherein the disk comprises a prerecorded optical disk.

6. The cartridge of claim 2, wherein the disk comprises a write-once optical disk.

7. The cartridge of claim 2, wherein the disk comprises a magneto-optic disk.

8. The cartridge of claim 2, wherein the disk comprises a phase change disk.

9. The cartridge of claim 2, wherein the disk has a format selected from the group consisting of audio CD, CD-R, CD-ROM, DVD, DVD-ROM, and DVD-RAM.

10. The cartridge of claim 2, wherein the disk has a diameter in a range of approximately 120 millimeters to approximately 130 millimeters.

11. The cartridge of claim 1, wherein, the shutter is rotatable to uncover the access area to allow the data storage disk drive to access the disk.

12. The cartridge of claim 11, wherein the shutter is mounted to rotate about a central portion of the inner housing and over an exterior surface of the inner housing.

13. The cartridge of claim 12, wherein the shutter includes a first shutter portion on a first side of the inner housing and a second shutter portion on a second side of the inner housing, the first shutter portion including a first mounting portion rotatably coupled at a central area of the first side of the inner housing, and the second shutter portion including a second mounting portion rotatably coupled at a central area of the second side of the inner housing, the cartridge further comprising a retainer mechanism for limiting movement of at least the first mounting portion outward from the first side of the inner housing.

14. The cartridge of claim 13, wherein the retainer mechanism includes a flange member mounted adjacent the central area of the second side of the inner housing, the flange member including a flange surface that extends over a portion of the first mounting portion.

15. The cartridge of claim 11, wherein the shutter includes first and second sides and a circumferential portion that joins the sides at a periphery of the disk, each of the sides being rotatably mounted to the inner housing at positions substantially concentric with a center of the disk and extending radially to the circumferential portion.

16. The cartridge of claim 11, further comprising a bias mechanism that exerts a bias force against the shutter to bias the shutter toward a closed position in which the shutter covers the access area, the shutter being rotatable by the disk drive against the bias force to uncover the access area.

17. The cartridge of claim 16, wherein the shutter defines a first surface oriented to engage a corresponding second surface in the disk drive, the shutter being movable by engagement with the corresponding surface to rotate the shutter against the bias force to uncover the access area.

18. The cartridge of claim 17, wherein the first surface includes a surface defining a hole in the shutter, and the second surface in the disk drive defines a pin oriented to engage the hole upon insertion of the inner housing into the disk drive.

19. The cartridge of claim 16, wherein the outer housing includes a structure that bears against the shutter when the inner housing is in the outer housing to keep the shutter in a closed position in which the shutter covers the access area.

20. The cartridge of claim 11, wherein the shutter is formed from a first material that is different than a second material from which a substantial portion of the inner housing adjacent the shutter is formed, the first and second materials being selected to reduce generation of debris due to abrasion between the shutter and the inner housing during movement of the shutter.

21. The cartridge of claim 1, further comprising a hub mounted within a central aperture in the disk, the hub rotatably holding the disk, wherein at least a portion of the hub is accessible via the inner housing and is thereby rotatable from the exterior of the inner housing to spin the disk.

22. The cartridge of claim 1, further comprising a hub that is mounted within a central area of the disk and rotatably holds the disk within the inner housing, the shutter being movable to uncover the access area and allow a disk drive to access the disk, wherein only the hub and a portion of the disk residing within the access area are accessible from the exterior of the inner housing.

23. The cartridge of claim 22, wherein a portion of the disk immediately adjacent an outer diameter of the hub is not accessible from the exterior of the inner housing.

24. The cartridge of claim 1, wherein the outer housing includes guide structures oriented to guide the inner housing along a substantially linear path upon retraction of the inner housing from the outer housing.

25. The cartridge of claim 24, wherein at least some of the guide structures and the inner housing are formed from different materials.

26. The cartridge of claim 1, wherein the inner housing includes a first locking structure and the outer housing includes a second locking structure, the first locking structure and the second locking structure communicating with one another upon insertion of the inner housing into the outer housing to thereby prevent removal of the inner housing from the outer housing, wherein one of the first locking structure and the second locking structure is manipulable by the disk drive to allow removal of the inner housing from the outer housing.

27. The cartridge of claim 26, wherein the second locking structure includes a beam member mounted on an interior surface of the outer housing and the first locking structure includes a groove and a locking indentation formed on an exterior surface of the inner housing, wherein the beam member bears against the groove during insertion of the inner housing into the outer housing and engages the locking indentation upon completion of insertion of the inner housing to prevent removal of the inner housing, the beam member being manipulable by the disk drive to disengage the beam member from the locking indentation and thereby allow removal of the inner housing from the outer housing.

28. The cartridge of claim 27, wherein the inner housing includes a hooking structure that is hooked by the disk drive to exert a pulling force against the inner housing, thereby removing the inner housing from the outer housing, and wherein the hooking structure and the locking indentation are disposed adjacent one another such that the disk drive can disengage the beam member from the locking indentation and exert the pulling force with a single hooking element.

29. The cartridge of claim 1, wherein the inner housing includes a hooking structure that is hooked by the disk drive to exert a pulling force against the inner housing, thereby removing the inner housing from the outer housing.

30. The cartridge of claim 29, wherein the door mechanism includes a door that is biased in a closed position.

31. The cartridge of claim 30, wherein the door mechanism includes a door that is mounted to swing into the outer housing, thereby allowing removal of the inner housing from the outer housing.

32. The cartridge of claim 1, wherein the door mechanism includes a first door mounted proximate to the slot, and a second door mounted proximate to the slot, wherein the first and second doors extend from opposite sides of the outer housing, the first and second doors being manipulable by the disk drive to allow removal of the inner housing through the slot.

33. The cartridge of claim 32, wherein the first and second doors are spring biased in a closed position, the first and second doors being manipulable to swing into the outer housing against the spring bias and thereby allow removal of the inner housing through the slot.

34. The cartridge of claim 1, wherein the outer housing includes a major section, a nose section, and a transition section defining an interface between the major section and the nose section, the nose section being at least partially insertable into the disk drive to allow removal of the inner housing from the outer housing.

35. The cartridge of claim 34, wherein the major section and nose section are sized such that at least the transition section defines an abutting surface that is abuttable with the disk drive upon insertion of the nose section into the disk drive, thereby limiting insertion of the outer housing.

36. The cartridge of claim 35, wherein the nose section of the outer housing includes a key structure defining a stop surface oriented to abut with the disk drive to prevent insertion of the nose section into the disk drive when the nose section is not inserted into the disk drive with a proper orientation.

37. The cartridge of claim 1, wherein at least a portion of the outer housing is sufficiently transparent to allow visibility of a portion of the inner housing from outside the outer housing.

38. The cartridge of claim 1, wherein the inner housing includes an identification area configured to carry an identification code, and the outer housing includes a viewing window that is positioned adjacent the identification area, the viewing window allowing visibility of the identification area from outside the outer housing.

39. The cartridge of claim 38, wherein the identification area includes a first identification area on a major surface of the inner housing, and a second identification area on an end surface of the inner housing, and wherein the viewing window includes a first viewing window that is positioned adjacent the first identification area, and a second viewing window that is positioned adjacent the second identification area.

40. The cartridge of claim 1, wherein the outer housing includes structure oriented to engage reciprocally formed structure on another cartridge, thereby facilitating stacking of the cartridge with the other cartridge.

41. The cartridge of claim 1, wherein the outer housing includes a first major side and a second major side, the first major side including a recess and the second major side including a raised area, wherein the recess is configured to receive another raised area on a second cartridge and the raised area is configured to be received by another recess on a third cartridge, thereby facilitating stacking of the housing of the cartridge with the second cartridge and the third cartridge.

42. The cartridge of claim 1, further comprising a filter disposed within the inner housing to capture debris within the inner housing.

43. A data storage disk cartridge for insertion into a data storage disk drive, the cartridge comprising:
   an inner housing configured to receive and contain a disk, the inner housing defining an aperture for access to a disk hub and a shutter that is movable to cover an uncover an access area, wherein a diameter of the aperture is such that a gap between the aperture and the hub is sufficiently small to limit the introduction of debris into the inner housing, thereby protecting a recording surface of the disk against debris; and an outer housing configured to receive and contain the inner housing, the outer housing including a door mechanism fixedly coupled to the outer housing proximate to a slot in the outer housing, wherein the door mechanism is openable and closable such that the outer housing encloses the inner housing in its entirety and thereby protects a surface of the inner housing against debris when the door mechanism is closed, and wherein the outer housing allows at least partial removal of the inner housing from the outer housing when the door mechanism is opened during use of the disk within the data storage disk drive.

* * * * *